(12) United States Patent
Kabasawa

(10) Patent No.: US 7,918,132 B2
(45) Date of Patent: Apr. 5, 2011

(54) POWER GENERATION DEVICE, FUEL PACKAGE, AND REMAINING FUEL AMOUNT MEASURING DEVICE

(75) Inventor: Yasunari Kabasawa, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/750,162

(22) Filed: Mar. 30, 2010

(65) Prior Publication Data

US 2010/0175466 A1 Jul. 15, 2010

Related U.S. Application Data

(62) Division of application No. 10/951,859, filed on Sep. 27, 2004, now Pat. No. 7,722,976.

(30) Foreign Application Priority Data

Sep. 25, 2003 (JP) .................................. 2003-332979
Sep. 25, 2003 (JP) .................................. 2003-332990

(51) Int. Cl.
*H01M 2/00* (2006.01)

(52) U.S. Cl. .......................................... 73/149; 429/447

(58) Field of Classification Search .................... 429/34, 429/19, 22, 38, 39, 447, 513, 515; 73/149
See application file for complete search history.

(56) References Cited

U.S. PATENT DOCUMENTS

| 3,468,713 | A | 9/1969 | Mueller |
| 6,121,628 | A * | 9/2000 | Rising .......................... 250/573 |
| 6,506,513 | B1 | 1/2003 | Yonetsu et al. |
| 6,610,433 | B1 | 8/2003 | Herdeg et al. |
| 6,924,054 | B2 | 8/2005 | Prasad et al. |
| 2002/0197522 | A1 | 12/2002 | Lawrence et al. |
| 2003/0082421 | A1 | 5/2003 | Yonetsu et al. |
| 2003/0124404 | A1 * | 7/2003 | Nau et al. ........................ 429/34 |
| 2004/0013927 | A1 | 1/2004 | Lawrence et al. |
| 2005/0074643 | A1 | 4/2005 | Adams et al. |

FOREIGN PATENT DOCUMENTS

| EP | 1 087 455 A2 | 3/2001 |
| JP | 4-223058 A | 8/1992 |
| JP | 08-001958 A | 1/1996 |
| JP | 2001-093551 A | 4/2001 |
| JP | 2001-328238 A | 11/2001 |
| JP | 2002-283541 A | 10/2002 |
| JP | 2003-036879 A | 2/2003 |
| WO | WO 02/099916 A2 | 12/2002 |

OTHER PUBLICATIONS

Japanese Office Action (and English translation thereof) dated Nov. 27, 2007, issued in a counterpart Japanese Application.

* cited by examiner

*Primary Examiner* — Jennifer Michener
*Assistant Examiner* — Monique Wills
(74) *Attorney, Agent, or Firm* — Holtz, Holtz, Goodman & Chick, PC

(57) ABSTRACT

A fuel package includes a vessel wherein the interior space is separated, and has a flow-out opening and a flow-in opening that lead to the interior space, a liquid fuel filled in the region at the side of the flow-out opening in the vessel, and a follower that separates the liquid fuel and the region at the side of the flow-in opening.

9 Claims, 13 Drawing Sheets

POWER GENERATION DEVICE, FUEL PACKAGE, AND REMAINING FUEL AMOUNT MEASURING DEVICE

CROSS-REFERENCE TO RELATED APPLICATIONS

The present application is a Divisional application of U.S. application Ser. No. 10/951,859 filed Sep. 27, 2004, now U.S. Pat. No. 7,722,976 which is based on Japanese Patent Applications Nos. 2003-332979 and 2003-332990 both filed on Sep. 25, 2003, the disclosures of the above patent applications are incorporated herein by reference in their entirety.

BACKGROUND OF THE INVENTION

1. Field of the Invention

The present invention relates to a fuel package that stores liquid fuel, a power generation device that comprises the fuel package and a power generation module that generates electric energy by the chemical reaction of the liquid fuel supplied from the fuel package, and a remaining fuel amount measuring device which measures the remaining amount of liquid fuel left in a vessel which stores liquid fuel stored and supplies the fuel to the power generation module.

2. Description of the Related Art

In recent years, compact electronics device, such as a portable telephone, a laptop computer, a digital camera, a wrist watch, a PDA (Personal Digital Assistance), and an electronic organizer, etc., are remarkably progressing and developing.

As the power source for the above compact electronics device, primary battery such as an alkaline battery and a manganese dry battery, and/or secondary battery such as a nickel cadmium battery, a nickel hydrogen battery, or a lithium-ion battery, are used. However, looking from the aspect of the usage efficiency of energy, energy is not always used efficiently in primary batteries and secondary batteries. On the other hand, fuel cells directly derives electric energy from chemical energy by electrochemically reacting fuel in the cell and the oxygen in the atmosphere, and are positioned as batteries that have good prospects for the future.

Therefore, in recent years, to replace the primary batteries and secondary batteries, research and development of the fuel cells with high usage efficiency of energy, is being carried out.

Because the compact electronics device such as above, are small, they are used in various directions and positions, in accordance with the scene used by the user. For example, a laptop computer is carried around, being held under one's arm, a portable telephone is carried around in a state where it is stored without much care in a pocket or a bag, and in some cases, people talk on the portable telephone, tilting the body of the portable telephone. Because the portable telephone constantly receives electric waves, it consumes electric power even at a stand-by-state. Therefore, in a case where a fuel cell is applied as a power source for these kind of electronic devices, it is preferable that fuel is stably supplied to the fuel cell even when the fuel cell or the fuel vessel that supplies fuel to the fuel cell is tilted as well as it is not tilted.

The fuel cell disclosed in Unexamined Japanese Patent Application KOKAI Publication No. 2001-93551, comprises a fuel cell main body wherein a proton transmitting plate is interleaved between a fuel electrode and an oxygen electrode, and a fuel vessel that stores liquid fuel, and is connected to the fuel cell main body. Pores are formed at the fuel vessel. Penetrating material is placed in the fuel vessel. The penetrating material extends from the fuel vessel to a connecting unit of the fuel cell main body. The liquid fuel in the fuel vessel penetrates to the connecting unit through the penetrating material, the liquid fuel that penetrated to the connecting unit is supplied to the fuel cell main body by capillary force, and electric energy is derived in the fuel cell main body. Even if the liquid fuel is consumed, because pores are formed at the vessel, the pressure balance between the fuel vessel and outside is maintained. If the fuel vessel becomes empty, it can be changed to a new one.

In a case where the fuel cell disclosed in Unexamined Japanese Patent Application KOKAI Publication No. 2001-93551 is placed in the portable compact electronics device, because the electronics device is used in various positions and directions (inclination), the fuel vessel also becomes various positions and directions (inclination). Therefore, according to the position/direction (inclination) of the fuel vessel, or the remaining amount of the liquid fuel, there are cases where the liquid fuel does not contact the penetrating member, and there is a possibility that even if the fuel vessel is not empty, supply of the liquid fuel to the fuel cell stops. Because the liquid fuel that penetrates to the penetrating material is retained in the penetrating material, by capillary force, there is a case where in the process of the liquid fuel being consumed, at the time that the capillary force that operates to the penetrating material, and the capillary force that operates at the side of the fuel cell main body match, liquid fuel is not supplied from the penetrating material to the fuel cell main body. Therefore, there is a fear that liquid fuel is left in the liquid fuel vessel.

Further, because the liquid fuel is supplied to the fuel cell main body by capillary force, there are cases where it takes a long time from the time that the fuel vessel is connected to the fuel cell main body, till the time the liquid fuel reaches the fuel cell main body.

Also, because the electronics device and the fuel vessel is used in various positions and directions, the liquid fuel in the fuel vessel flows to various position in accordance with the position of the fuel vessel. Therefore, it is difficult to quantitatively measure the remaining amount of fuel in the fuel vessel.

SUMMARY OF THE INVENTION

An advantage of the present invention is to provide a power generation device, a fuel package, and a power generation module, which can stably supply the stored liquid fuel without remaining.

Another advantage of the present invention is to provide a remaining fuel amount measuring device that can measure the reaming amount of stored liquid fuel, in any.

A power generation device according to a first aspect of the present invention, comprises
  a fuel package that includes:
    a vessel wherein the interior space is separated, and has a flow-out opening and a flow-in opening that lead to the interior space;
    a liquid fuel filled in a region at the side of the flow-out opening in the vessel; and
    a follower that separates the liquid fuel and the region at the side of the flow-in opening, and
  a power generation module that includes a suction opening that is freely connected to the flow-out opening of the fuel package, and a first exhaust opening that is freely connected to the flow-in opening of the fuel package, generates electric energy based on the liquid fuel supplied from the fuel package, and exhausts a part of the product generated from the liquid fuel by chemical reaction, from the fist exhaust opening.

A fuel package according to a second aspect of the present invention, comprises:

a vessel wherein the interior space is separated, and includes a flow-out opening and a flow-in opening that leads to the interior space;

a liquid fuel filled in a region at the side of the flow-out opening in the vessel; and a follower that separates the liquid fuel and the region at the side of the flow-in opening.

According to the above inventions, a flow-in opening is provided so that fluid (such as gas and liquid) can flow into, to prevent the pressure in the interior space from decreasing, in accordance with the liquid fuel decreasing when the liquid fuel stored in the fuel package flows out from the flow-out opening, the pressure in the interior space can be kept equal to or higher than a predetermined pressure, in spite of the liquid fuel flowing out. Therefore, the follower easily follows the back-end of the liquid fuel and, it is difficult to vacant space between the flow-out opening and the follower, especially, between the flow-out opening and the liquid fuel and between the liquid fuel and the follower. Therefore, even position, direction, inclination of the generating device and/or the fuel package are changed, the flow-out opening is filled with the liquid fuel. Therefore, this fuel package can supply the liquid fuel stably.

A remaining fuel amount measuring device which measures the remaining amount of a liquid fuel, comprises a sensor which detects the displacement of a follower that separates the end of the liquid fuel, in the liquid chamber that has the liquid fuel filled, so that is covered, and follows the end of the liquid fuel.

According to the present invention, because the follower follows the change of position of the end of the liquid fuel by the consumption of liquid fuel, the remaining amount of liquid fuel can be measured by the sensor detecting the displacement of the follower by the transfer. Because this operation is due to the surface tension of the follower, the remaining amount of the liquid fuel can be measured from the position of the follower, in spite of the direction that the end of the liquid fuel faces, i.e., in spite of the position of the vessel.

BRIEF DESCRIPTION OF THE DRAWINGS

The advantages of the present invention will become more apparent upon reading of the following detailed description and the accompanying drawings in which.

DETAILED DESCRIPTION OF THE PREFERRED EMBODIMENT

A preferred embodiment of the present invention will be described, with reference to the drawings.

Figure 1:
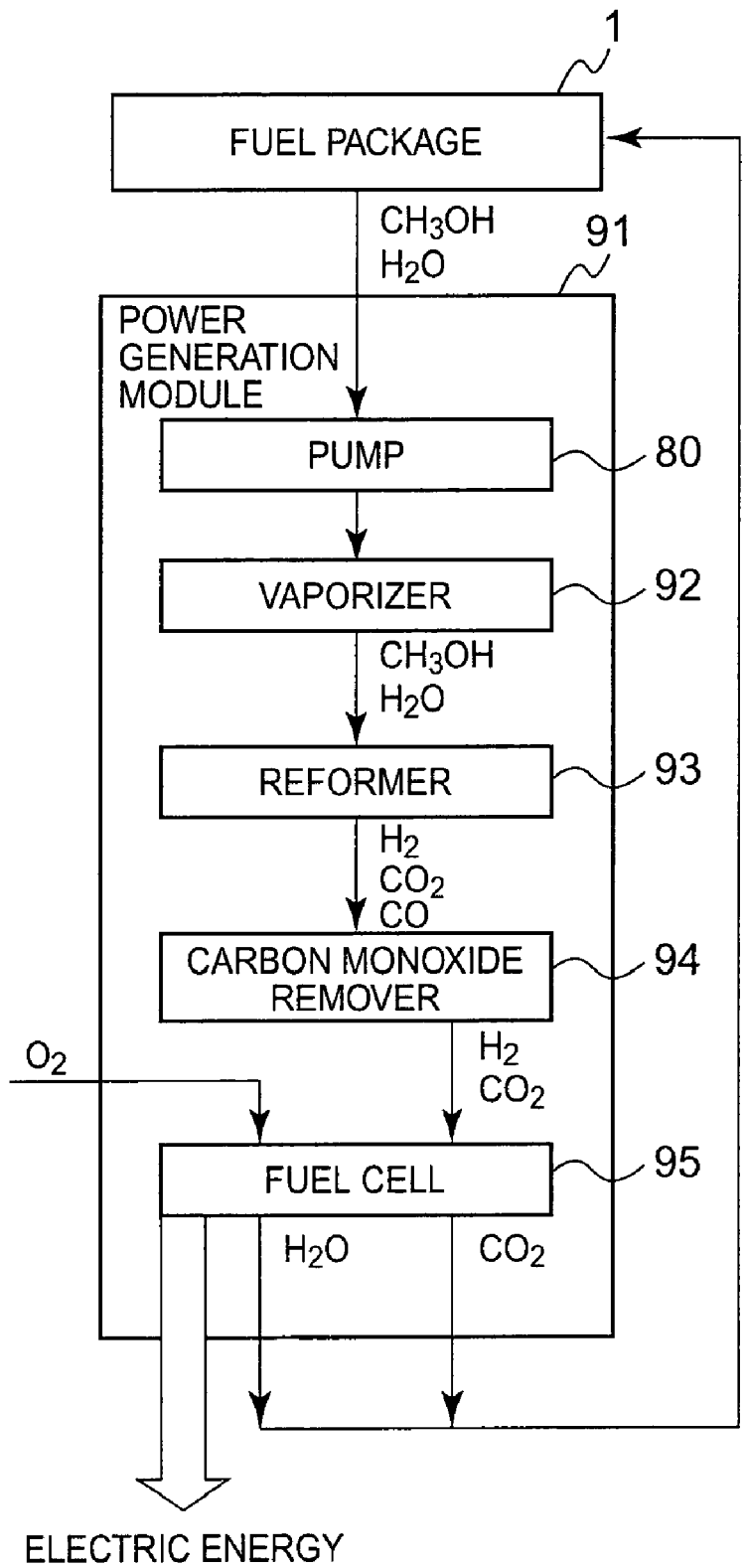
FIG. 1 is a block diagram showing the basic structure of a power generation device.
Figure 2:
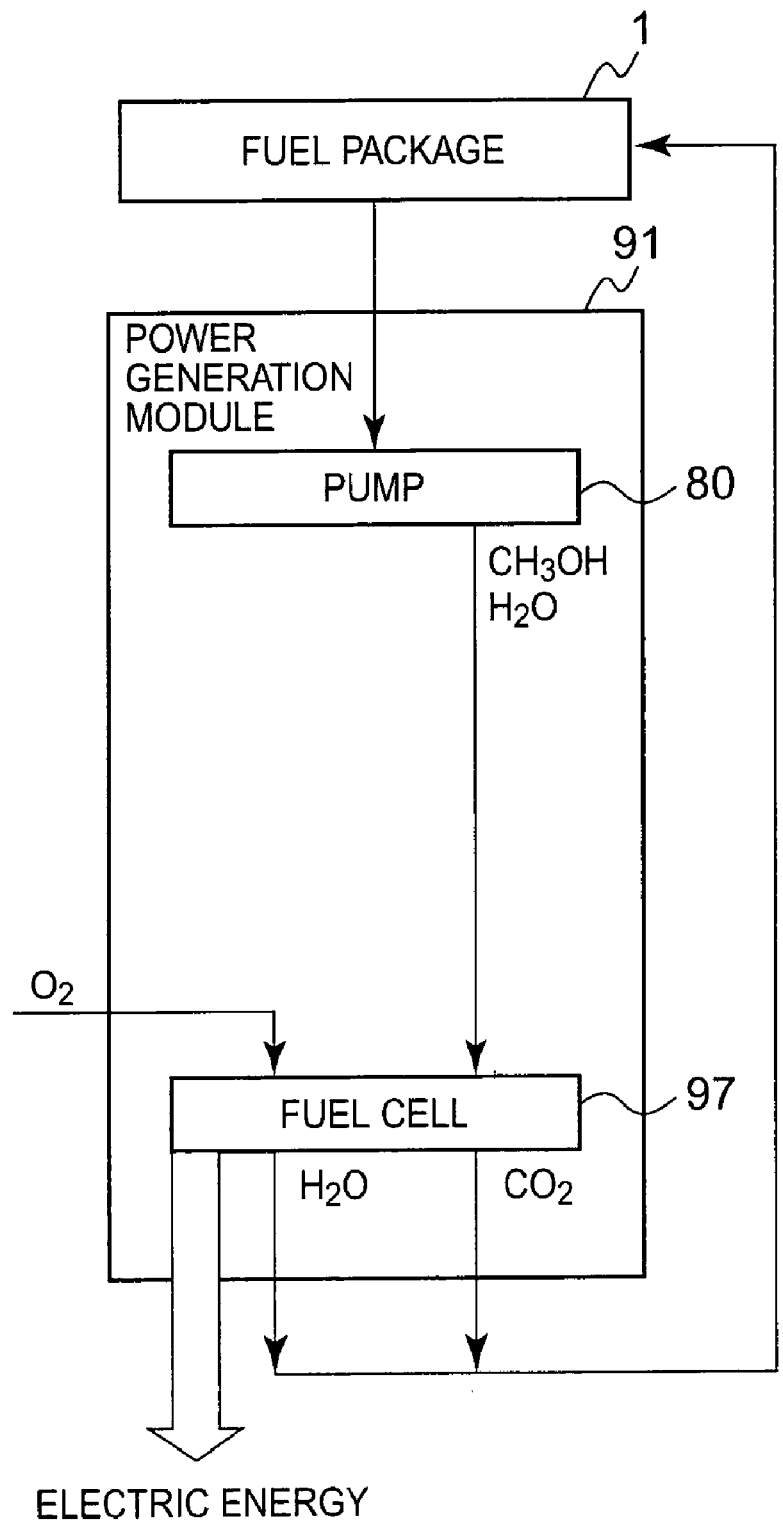
FIG. 2 is a block diagram showing the basic structure of another power generation device.

FIG. 1 is a block diagram of a fuel reforming type power generation device having a remaining fuel amount measuring device, and FIG. 2 is a block diagram of a direct fuel power generation device. The present invention can be applied to either power generation device.

Figure 5:
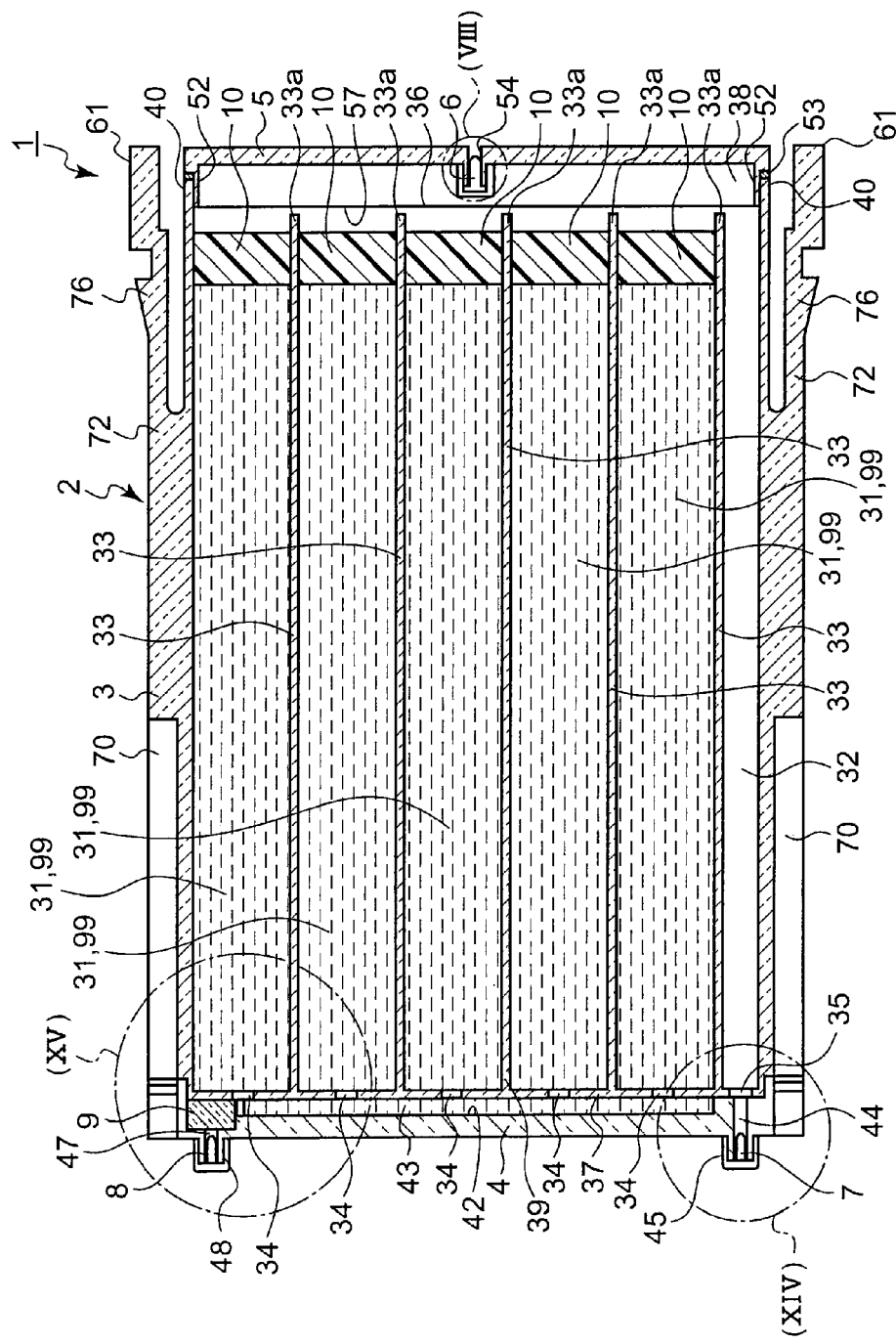
FIG. 5 is a cross-section view of the fuel package being cut in the direction of arrows, in accordance with the broken lines V-V shown in FIG. 3.

As shown in FIGS. 1 and 2 both power generation devices comprise a fuel package 1 shown in FIG. 5 for storing a liquid fuel 99, and a power generation module 91 which generates electric energy from the liquid fuel 99 stored in the fuel package 1. The fuel package 1 is freely attachable/detachable to/from the power generation module 91. Here, freely attachable/detachable to/from the power generation module 91, means that the flow passages in the fuel package 1 and the power generation module 91 that introduce the liquid fuel 99 from the fuel package 1 to the power generation module 91 are freely connected/disconnected physically. The power generation devices further comprise a connecting interface for detachably connecting the fuel package 1 to the power generation module 91, and a remaining fuel amount measuring device for measuring the remaining amount of liquid fuel 99 left in the fuel package 1.

The liquid fuel 99 is a compound of liquid chemical fuel and water. As the chemical fuel, compounds including hydrogen atoms such as alcohol such as methanol and ethanol, etc., and diethyl ether and gasoline may be used. In the present embodiment, compound methanol and water is used as the liquid fuel 99.

As shown in FIG. 1, in the fuel reforming power generation device, the power generation module 91 comprises a vaporizer 92, a reformer 93, a carbon monoxide remover 94, a fuel cell 95, and a pump 80. Each of the vaporizer 92, the reformer 93 and the carbon monoxide remover 94 is a small chemical reactor called a micro reactor. In the interior of each micro reactor, a flow passage through which a liquid fuel 99 or a reformed fuel, and a heater for generating heat for promoting chemical reaction in the flow passage, are formed.

Each of the vaporizer 92, the reformer 93, and the carbon monoxide remover 94 has two or more substrates laminated with each other or put together. The substrates has the flow passage formed by a groove covered by opposing substrates. The flow passage or groove has both the depth and the width of 0.05 mm to 0.2 mm.

The liquid fuel 99 stored in the fuel package 1 is supplied to the vaporizer 92 by the pump 80. In the vaporizer 92, the heater heats the supplied liquid fuel 99 to vaporize it and generate a mixture gas of methanol and water vapor, i.e. gasous fuel. The mixture gas generated in the vaporizer 92 is supplied to the reformer 93. In the fuel package 1, methanol and water may be stored separately. In this case, an exhaust openings which separately exhaust necessary amounts of methanol and water, are necessary in the fuel package 1.

The reformer 93 generates hydrogen and carbon dioxide from the mixture gas supplied from the vaporizer 92. More specifically, as shown in chemical formula (1), methanol and water vapor in the mixture gas react by catalyst, and carbon dioxide and hydrogen are generated.

$$CH_3OH+H_2O \rightarrow 3H_2+CO_2 \quad (1)$$

In the reformer 93, there is a case where mixture gas of methanol and water vapor is not completely reformed to carbon dioxide and hydrogen. In this case, as shown in chemical formula (2), methanol and water vapor react, and carbon dioxide and carbon monoxide are generated.

$$2CH_3OH+H_2O\ 5H_2+CO+CO_2 \quad (2)$$

The gases generated in the reformer 93 are supplied to the carbon monoxide remover 94.

The carbon monoxide remover 94 removes carbon monoxide from the mixture gas supplied from the reformer 93, by selectively oxidizing the carbon monoxide included in the mixture gas. More specifically, the carbon monoxide included in the mixture gas supplied from the reformer 93, and the oxygen taken in from the atmosphere reacts by catalyst, and carbon dioxide is generated.

$$2CO+O_2\ 2CO_2 \quad (3)$$

The mixture gas that includes hydrogen, is supplied to a fuel electrode of the fuel cell 95 from the carbon monoxide remover 94.

The fuel electrode of the fuel cell 95, as shown in electrochemical reaction formula (4), separates hydrogen included in the mixture gas supplied from the carbon monoxide remover 94 into hydrogen ions and electrons by the influence of the catalyst of the fuel electrode. The hydrogen ion reaches at an air electrode via an ion conductive (permeable) film, and the electrons removed from the hydrogen are taken by the fuel electrode.

$$H_2 \rightarrow 2H^+ + 2e^- \quad (4)$$

Air is introduced and supplied to the air electrode of the fuel cell 95. Then, as shown in electrochemical reaction formula (5), the oxygen in the air, the hydrogen ions that passed the ion conductive film, and the removed electrons react, and water is generated as a by-product.

$$2H^+ + 1/2O_2 + 2e^- \rightarrow H_2O \quad (5)$$

As the above, by the electrochemical reaction shown in the above (4) and (5), occurring in the fuel cell 95, electrical energy is generated. A mixture gas of water, carbon dioxide, and air, etc., as the generated by-product is exhausted to the fuel package 1.

On the other hand, as shown in FIG. 2, in the direct fuel power generation device, the power generation module 91 comprises the pump 80 and the fuel cell 97.

The liquid fuel 99 supplied to the pump 80 from the fuel package 1 is introduced to the pump 80, and is supplied to the fuel electrode of the fuel cell 97.

At the fuel electrode of the fuel cell 97, as shown in electrochemical reaction formula (6), the liquid fuel supplied from the pump 80 is separated into hydrogen ions and electrons, by the influence of the catalyst of the fuel electrode. The hydrogen ions reaches at an air electrode via an ion conductive (permeable) film, and the electron is removed by the fuel electrode.

$$CH_3OH + H_2O \rightarrow CO_2 + 6H^+ + 6e^- \quad (6)$$

Air is introduced and supplied to the air electrode of the fuel cell 97. Then, as shown in electrochemical reaction formula (7), the oxygen in the air, the hydrogen ions that passed the ion conductive film, and the removed electrons react, and water is generated as a by-product.

$$6H^+ + 3/2O_2 + 6e^- \rightarrow 3H_2O \quad (7)$$

As the above, by the electrochemical reactions shown in formulas (6) and (7) occurring in the fuel cell 97, electronic energy is generated. A mixture gas including as water, carbon dioxide, and air, etc., are exhausted to the fuel package 1. Methanol that does not react in the fuel cell 97 may be circulated so that it is introduced to the pump 80 and re-supplied to the fuel cell 97 again.

In a case where this power generation device is applied to an electronics device represented by for example, a laptop computer, a digital camera, a PDA (Personal Digital Assistance), and an electronic organizer, etc., the power generation module 91 is fixed to the electronic device body, so that the fuel package 1 can be freely attached to/detached from the electronics device body, and the electronics device operates by using the electronic energy generated in the power generation module 91. It is preferable that a charging unit which charges the electronic energy generated in the fuel cell 95 or the fuel cell 97, and outputs the energy to the electronics device, is provided in the power generation module 91 or in the electronics device, so that the electronic energy that generated in the power generation module 91 can be output in accordance with the request from the electronics device. In a case where the amount of energy charged in the charging unit decreases by output the energy to the electronics device or consumption in the interior, the charging unit outputs a control signal so that the control circuit in the power generation module 91 operates the pump 80 to supply the liquid fuel 99 to the vaporizer 92 or the fuel cell 97, so as to generate the compensating amount of electronic energy.

Next, the fuel package 1 will be described with reference to FIGS. 3 to 7.

Figure 3:
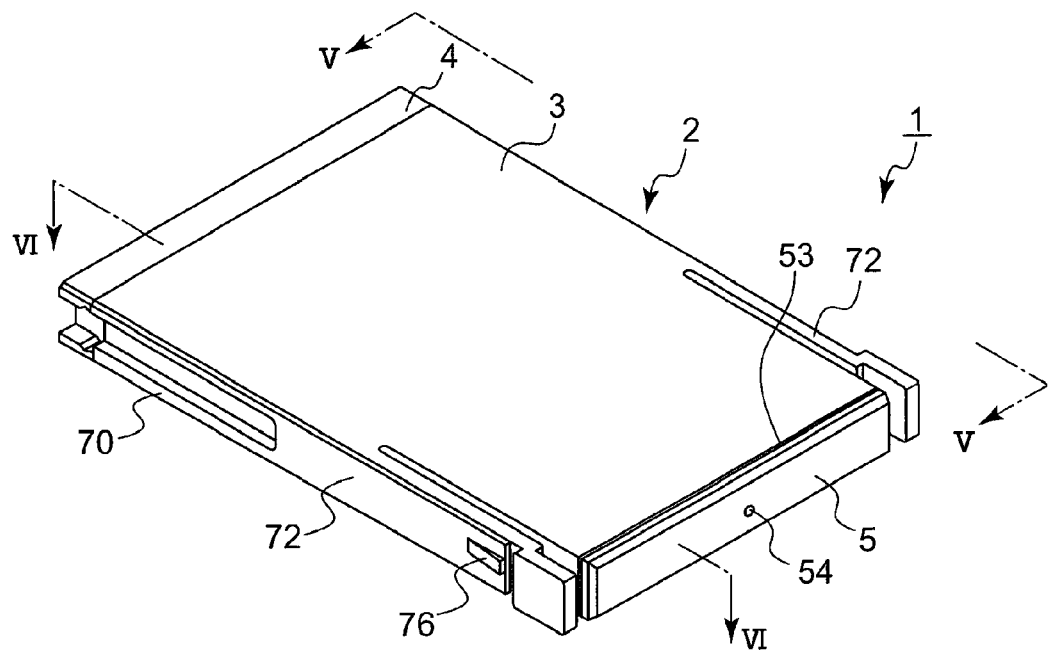
FIG. 3 is a perspective view showing a fuel package.
Figure 4:
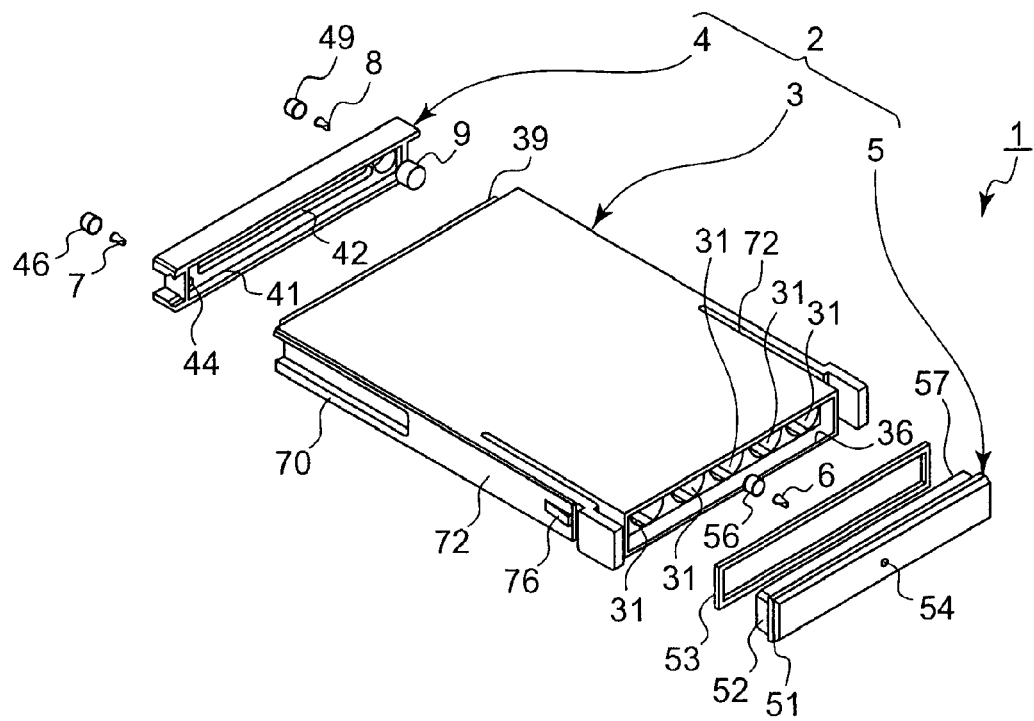
FIG. 4 is a perspective view showing the fuel package decomposed.
Figure 6:
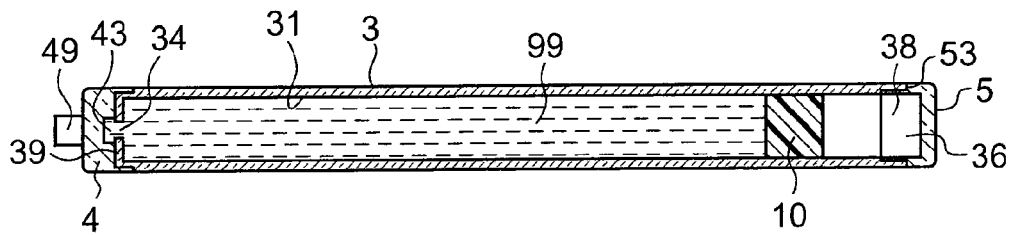
FIG. 6 is a cross-section view of the fuel package being cut in the direction of arrows, in accordance with the broken lines VI-VI shown in FIG. 3.
Figure 7:
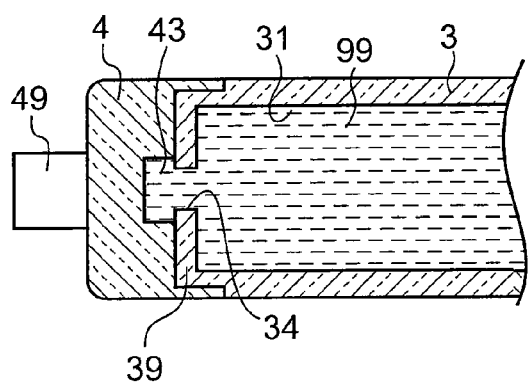
FIG. 7 is a cross-section view showing a part of FIG. 6 enlarged.

FIG. 3 is a perspective view showing the fuel package 1, FIG. 4 is an exploded perspective view of the fuel package 1, FIG. 5 is an approximate cross-sectional view when the fuel package 1 is cut in a plane surface direction, FIG. 6 is an approximate cross-section view when the fuel package 1 is cut in a thickness direction, and FIG. 7 is a cross-sectional view showing the cross-section of the tip of the fuel package 1 in FIG. 6.

The fuel package 1 comprises a cylinder vessel 2 that has the liquid fuel 99 filled. The fuel package 1 has various members being attached to the cylinder vessel 2. The cylinder vessel 2 comprises a vessel main body 3 that has an interior space and has an exterior shape of approximately rectangular plate, a front lid member 4 attached to the front end portion of the vessel main body 3, and a back lid member 5 attached to the back end portion of the vessel main body 3.

As shown in FIG. 5, the interior space of the vessel main body 3 is separated to a plurality of chambers (liquid chamber) 31,31 . . . (five liquid chambers 31 in the drawing) that are long in the front-back direction (the longitudinal direction of the vessel 2), and one pressurized flow passage 32 that is long in the front-back direction. More specifically, a plurality of bulkheads (partitions) 33 that extend to the front-back direction are formed at the interior of the vessel main body 3, so as to separate the adjoining liquid chambers 31, 31, . . . , and the liquid chamber 31 and the pressurized flow passage 32. In other words, the bulkheads separates the interior space and form liquid chamber 31, 31, . . . , and the pressurized flow passage 32. The bulkheads 33 are arranged parallel to each other and separated at a predetermined distance from each other, the plurality of liquid chambers 31, 31, . . . , and the pressurized flow passage 32 are arranged in parallel with each other, in the interior space of the vessel main body 3. The length in the front-back direction of the bulkheads 31, 31, . . . , is a little shorter than the length of the circumference of the vessel main body 3, and each back end of the bulkheads 33, 33, . . . , is placed somewhat more to a front end surface 37 side than a back end portion 40 of the vessel main body 3. As shown in FIG. 4, at back end portions 33a, 33a, . . . of the bulkheads 33, an opening 36 that opens the back ends of the liquid chambers 31, 31, . . . , and the back end of the pressurized flow passage 32, are formed. If there are a plurality of liquid chambers 31, 31, . . . , the number is not limited to five, and may be equal to or more than five, or equal to or less than five.

The length in the front-back direction of the liquid chambers 31, 31, . . . , are all equal with each other. Also, the cross-sectional areas of the interior space of the plurality of the liquid chamber 31, 31, . . . , when each liquid chamber 31 is cut at a plane perpendicular to the longitudinal direction thereof, is constant from the side of the front end surface 37 to the side of the back end portion 40. Further, each liquid chamber 31,31, . . . has an approximately tubular or cylindrical shape. To measure the remaining amount of liquid fuel 99 with the remaining fuel amount measuring device, the cross-sections of the liquid chambers 31, 31, . . . when being cut at a plane perpendicular in the longitudinal direction, is one of the following (A), (B), or (C).

(A): The volumes of all the liquid chambers 31, 31, . . . are equal with each other or the cross-section areas of the interior space of the all the chambers 31, 31, . . . are equal with each other.

(B): At least one of the liquid chambers 31, 31, . . . has a larger cross-section area of the interior space, when the liquid chamber 31 is cut at a plane perpendicular to the longitudinal direction thereof, than those of any other chambers 31, therefore, the volume of the at least one liquid chamber 31 is larger than those of the other liquid chambers 31.

(C): At least one of the liquid chambers 31, 31, . . . has a smaller cross-section area of the interior space, when the liquid chamber 31 is cut at a plane perpendicular to the longitudinal direction thereof, than those of any other chambers 31, therefore, the volume of the one liquid chamber 31 is smaller than those of the other liquid chambers 31.

Concerning (B) and (C), there are cases where for example, the liquid chamber 31 placed at the most right side in FIGS. 3 and 4 (the upper side in FIGS. 22 and 24), has the largest cross-section area, therefore the volume in the chamber 31 is the largest, and going leftwards (the lower side in FIGS. 22 and 24), the cross-section area of the liquid chambers 31, consequently the volume in the liquid chambers 31 become smaller, and the chamber 31 placed at the most left side has the smallest cross-section area, therefore the volume in the chamber 31 is the smallest (the case shown in FIGS. 22 to 24), or the liquid chamber 31 placed at the most left side (the upper side in FIGS. 22 and 24), has the largest cross-section area, therefore the volume in the chamber 31 is the largest, and going rightwards (the upper side in FIGS. 22 and 24), the cross-section area of the liquid chambers 31, consequently the volume in the liquid chambers 31 become smaller, and the chamber 31 placed at the most right side has the smallest cross-section area, therefore the volume in the chamber 31 is the smallest.

At the back end portion 40 of the vessel main body 3, the back lid member 5 that covers the back end portion 30 a predetermined distance away from the liquid members 31, 31, . . . and the pressurized flow passage 32 is attached. As shown in FIG. 4, the back lid member 5 comprises a covering section 51 and a connecting section 52. The covering section 51 is for separating the space at the back end side of the vessel main body 3, and is formed at the same shape and size as the peripheral surface of the back end portion 40 of the vessel main body 3. The connecting section 52 is a lid which the back end side is covered by the covering section 51, that has a front end portion 57 closed. The connecting section 52 is inserted to the inner walls of the back end portion 40 of the vessel main body from the front end portion 57, and connects with the vessel main body 3, to form a closed space 38 at the opening 36 of the vessel main body.

More specifically, a seal member 53 made of flexible material such as rubber, etc., is fit to the outer rim of the connecting section (fitting section) 52 of the back lid member 5. the seal member 53 is connected to or abutted to the covering section 51. Further, the connecting section 52 is inserted from the back end surface of the vessel main body 3 so as to connect or abut the seal member 53 to the back end portion 40, so that the back lid member 5 fits into the opening 36. By supporting the seal member 53 in this way, the space or gap between the vessel main body 3 and the lid member 5 is filled, the cylinder vessel 2 is sealed. Therefore, the fuel 99 in the liquid chambers 31, 31, . . . , leaking from between the vessel main body 3 and the lid member 4 is prevented.

By the back lid member 5 being attached to the back end surface of the vessel main body 3, the opening 36 is covered by the covering section 51 of the back lid member 5, and as shown in FIG. 5, a pressure adjustment chamber 38 is formed at the opening 36. Because both the liquid chambers 31, 31, . . . , and the pressurized flow passage 32 are open at the opening 36, it becomes possible that the fluid that flows into the pressurized flow passage 32 flows out to the liquid chambers 31, 31, . . . , via the pressure adjustment chamber 38.

Figure 8:
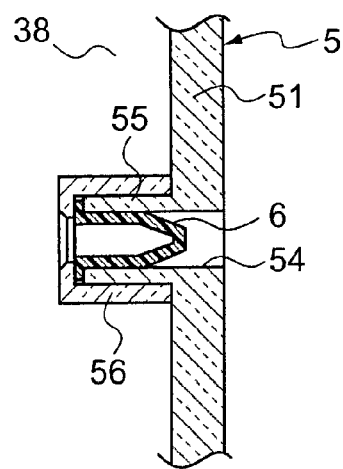
FIG. 8 is a cross-section view showing the region (III) in FIG. 5 enlarged.
Figure 9:
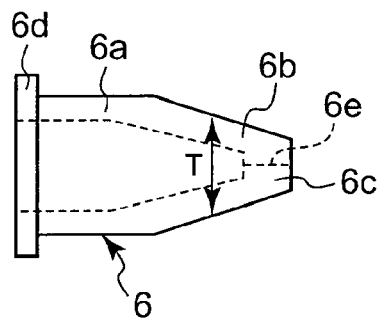
FIG. 9 is a side view of a check valve.
Figure 10:
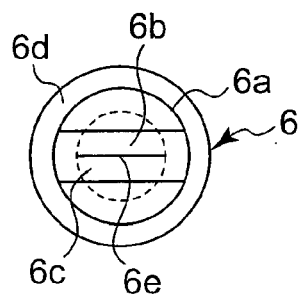
FIG. 10 is a front view of the check valve shown in FIG. 9.
Figure 11:
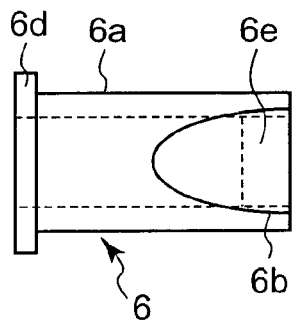
FIG. 11 is a top view of the check valve shown in FIG. 9.
Figure 12:
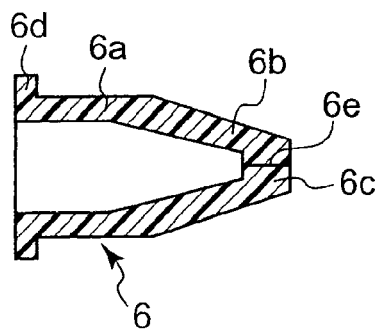
FIG. 12 is a cross-section view showing the check valve shown in FIG. 9.

At the covering section 51 of the back lid member 5, an exhaust opening 54 that leads from the pressure adjustment chamber 38 to the outside, is formed. FIG. 8 is an enlarged view of a peripheral region (VIII) of the exhaust opening 54 shown in FIG. 5. As shown in FIG. 8, a tubular portion 55 that forms the exhaust opening 54, is formed at the covering section 51 so that it protrudes towards the interior of the pressure adjustment chamber 38. A second check valve 6, which irreversibly allows the flow of a fluid only to a direction towards the outside, from the pressure adjustment chamber 38, via the exhaust opening 54, is fit to the exhaust opening 54. As shown in FIGS. 9 to 12, the second check valve 6 is a duckbill valve formed in a duckbill-shape (the shape of the bill of the duck) formed of material that has flexibility and elasticity (for example, elastomer (rubber)). Here, FIGS. 8 and 9 are side views of the check valve 6, in a case where it is seen from the same direction, FIG. 10 is a front view of the second check valve 6, FIG. 11 is an upper surface view of the second check valve 6, and FIG. 12 is a cross-sectional view cutting the second check valve 6 in a longitudinal direction.

Describing in detail, the second check valve 6 comprises a main body part 6a that has a tubular shape, an upper lip part 6a and a lower lip part that are integrally formed at the tip end side of the main body part 6a, and are stacked one above the other, and a ring-shaped flange part 6d that is integrally formed at the back end portion of the main body part 6a, and is formed so that it protrudes radially outwards from the outer wall of the main body part 6a. At the back end of the second check valve 6, an interior hollow of the main body part 6a is open. By the upper lip part 6b and the lower lip part 6c being formed so that they are stacked one above the other, at the end tip of the second check valve 6, the interior hollow is closed at the tip end of the second check valve 6, and a horizontally long interstice 6e defined by the upper lip part 6b and the lower lip part 6c is formed at the tip end of the second check valve 6. The interstice 6e leads to the interior hollow. The upper lip part 6b and the lower lip part 6c are formed in a tapered shape so that the entire thickness T thereof, become thinner as going towards the tip end of the second check valve 6.

In the second check valve 6, in a situation where the pressure in the interior hollow and the pressure of the outside tip end of the second check valve 6 is the same, the interstice 6e is closed, or becomes a state where the interstice 6e is somewhat open (this kind of state is called the initial state). On the other hand, in a situation where the pressure in the interior hollow is higher than the pressure of the outside tip end of the second check valve 6, the interstice 6e opens wider than the initial situation, by the upper lip part 6b and the lower lip part 6c elastically transforming, and flow of the fluid to the outside tip end of the second check valve 6 from the interior hollow via the interstice 6e is permitted (this situation is called the open situation). In a situation where the pressure in the interior hollow is lower than the pressure of the outside tip end of the second check valve 6, the interstice 6e closes by the upper lip part 6b and the lower lip part 6c elastically transforming, and flow of the fluid to the interior hollow from the outside tip of the second check valve 6 via the interstice 6e is prevented (this situation is called the closed situation).

As shown in FIG. 8, this kind of second check valve 6 is attached to the back lid member 5, by setting the tip end thereof towards the outside from the pressure adjustment chamber 38, fitting the upper lip part 6b, the lower lip part 6c, and the main body part 6a to the exhaust opening 54, and locking the flange part 6d to the tip of the tubular portion 55 of the inner wall of the pressure adjustment chamber 38. The second check valve 6 is fixed by connecting a valve stopper 56 having a hollow tubular shape, which comprises a ring-shape flange section that is formed so that it protrudes inwards from the inner wall thereof, to the tubular portion 55, and further supporting the flange part 6d of the second check valve 6 from both sides, with the flange section of the valve stopper 56 and the tip of the tubular portion 55.

As shown in FIG. 4, at the front end portion of the vessel main body 3, a connecting section 39 which is thinner than the center part of the vessel main body 3, is formed protruding towards the front, and the tip surface of the connecting section 39 forms a front end surface 37 of the vessel main body 3.

At the position of the front end surface 37 that corresponds to each of the liquid chambers 31, communicating holes 34 that penetrates to the liquid chambers 31, are formed. A net that has a plurality of minute slits, may be stretched over these communicating holes 34, 34, . . . .

To measure the remaining amount of fuel 9 with the remaining fuel amount measuring device, the relationship between the opening area of these communicating holes 34, 34, . . . , and the cross-section area of the liquid chambers 31, 31, . . . , are as below.

In a case where the cross-section areas of all the liquid chambers 31, 31, . . . are equal with each other, such as the above (A), (A-1): the opening area of the communicating hole 34 that is placed at the most right is the largest, and moving towards the left, the opening area of the communicating hole 34 becomes smaller, the communicating hole 34 placed at the most left having the smallest opening area, or (A-2): the opening area of the communicating hole 34 that is placed at the most left (lower side in FIGS. 19 to 21) is the largest, and moving towards the right, (upper side in FIGS. 19 to 21), the opening area of the communicating hole 34 becomes smaller, the communicating hole 34 placed at the most right having the smallest opening area.

Figure 22:
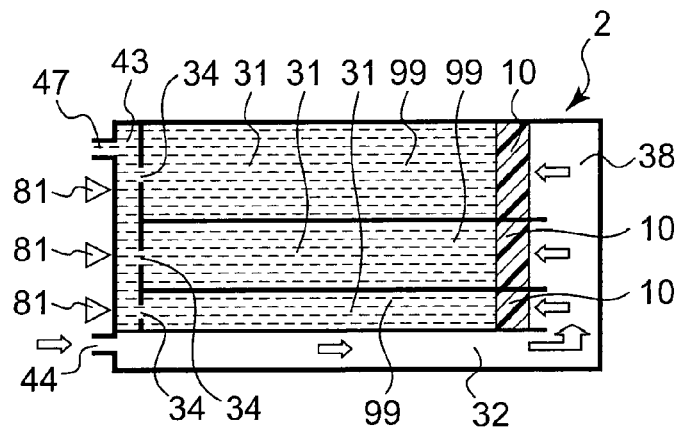
FIG. 22 is a transverse sectional view for describing operation of the remaining fuel amount measuring device according to the fuel that flows out.
Figure 23:
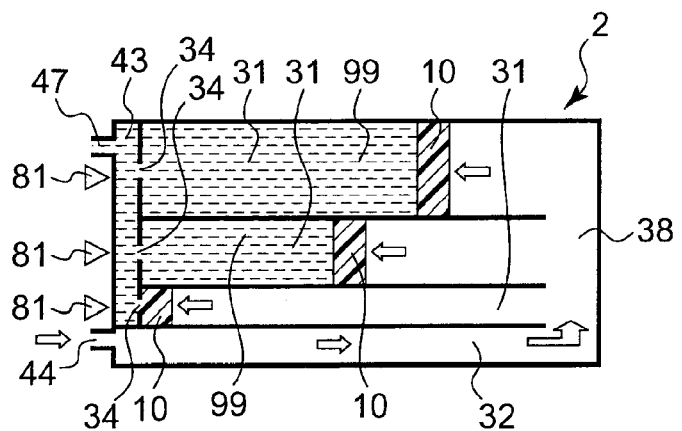
FIG. 23 is a transverse sectional view for describing operation of the remaining fuel amount measuring device according to the fuel that flows out.
Figure 24:
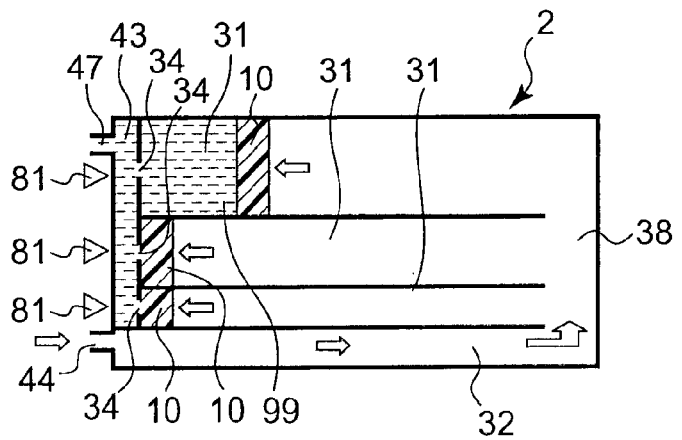
FIG. 24 is a transverse sectional view for describing operation of the remaining fuel amount measuring device according to the fuel that flows out.

As the above (B) or the above (C), in a case where the cross-section area of the liquid chambers 31, 31, . . . differ, the opening area of all the communicating holes 34, 34, . . . , are equal (the case shown in FIGS. 22 to 24).

Figure 13:
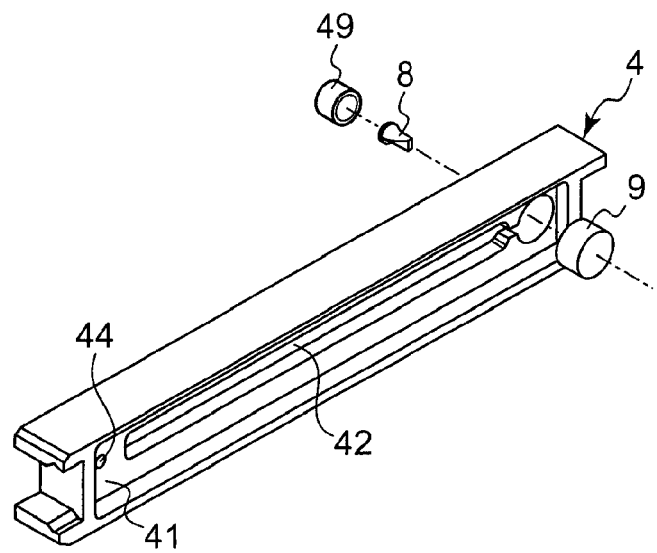
FIG. 13 is a perspective view of a front lid member.
Figure 14:
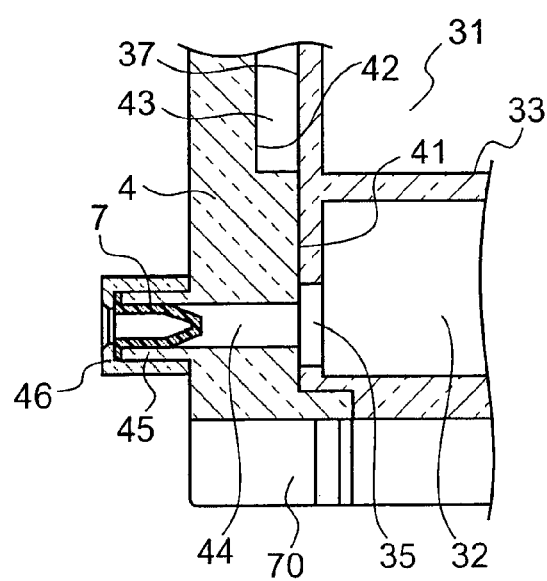
FIG. 14 is a cross-section view showing the region (XIV) in FIG. 5 enlarged.

At the position that corresponds to the pressurized flow passage 32 of the front end surface 37 of the vessel main body 3, a communicating hole 35 that leads to the pressurized flow passage 32 is formed. At the front end portion of the vessel main body 3, the front lid member 4 that covers the front end portion is attached. Here, FIG. 13 is a perspective view of the front lid member 4. At the front lid member 4, an opening groove 41 that opens to the side of the vessel main body 3 is formed long in the lateral direction. Further, at the bottom of the opening groove 41, a step groove 42 that has a smaller opening area than the opening groove 41, is formed digging down long in the lateral direction. The opening groove 41 fits to the connecting section 39 of the vessel main body 3, and at the periphery of the communicating hole 35 that leads to the pressurized flow passage 32, as shown in FIG. 14, the front end surface 37 of the vessel main body 3 is connected to the bottom of the vessel main body 3, and at the periphery of the communicating holes 34, 34, . . . that lead to the liquid chambers 51, 51, . . . , the front end surface 37 of the vessel main body 3 is separated from the bottom of the step groove 42. By the bottom of the step groove 42 being separated from the front end surface 37 of the vessel main body 3, a communicating chamber 43 which is an interior space defined by the step groove 42, if formed. The wall surface of the communicating chamber 43 comprises the front end surface 37 of the vessel main body 3 and the front lid member 4, and the communicating chamber 43 leads to the plurality of liquid chambers 31, 31, . . . , via the communicating holes 34, 34, . . . .

At the position corresponding to the communicating hole 35 of the front lid member 4, a flow-in opening 44 that leads from the bottom of the opening groove 41 to the front side outside portion, is formed, and the flow-in opening 44 and the communicating hole 35 leads thereto. In FIG. 14, an area XIV around the flow-in opening 44 shown in FIG. 5, is shown expanded. As shown in FIG. 14, a tubular flow-in nipple part 45 that forms the flow-in opening is formed at the front lid member 4 so that is protrudes towards the front outers side (left side in the drawing). A third check valve 7 that permits the irreversible flow of liquid only towards the direction from the outside to the pressurized flow passage 32 (direction from the left side to the right side in the drawing), via the flow-in opening 44 and the communicating hole 35 is fit to the flow-in opening. The third check valve 7 is constituted in the same way as the second check valve 6 shown in FIGS. 9 to 12. In the same way as the second check valve 6, the third check valve 7 is a duckbill valve formed in a duckbill-shape by material that has flexibility and elasticity. The tip of the third check valve 7 is fit into the flow-in opening 44, from the outside towards the pressurized flow passage 32. The third check valve 7 is fixed by the flange part of the third check valve 7 being supported between the flange part of the valve stopper 46 fit to the flow-in nipple part 45, and the tip of the flow-in nipple part 45, in a state where the flange part of the third check valve 7 (corresponding to 6d in FIGS. 9 to 12) is locked to the tip of the flow-in nipple part 45.

Figure 15:
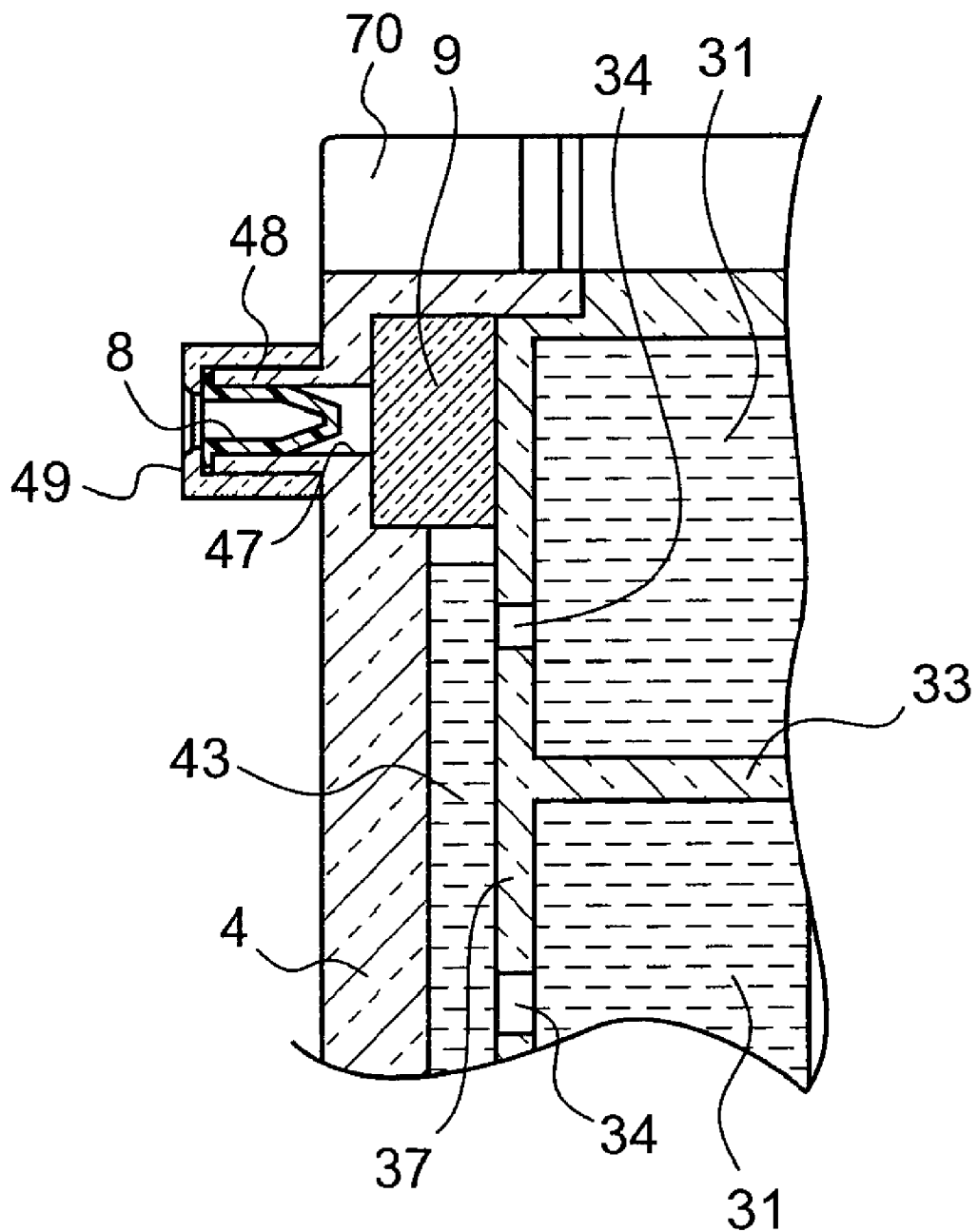
FIG. 15 is a cross-section view showing the region (XV) in FIG. 5 enlarged.

As shown in FIG. 5, at a position a predetermined distance away from the flow-in opening 44, and being a pair side by side with flow-in opening 44, a flow-out opening 47 that leads from the bottom of the step groove 42 to the front outside part is formed. This flow-out opening leads to the communicating chamber 43. A region XV around the flow-out opening 47 shown in FIG. 5, is shown in FIG. 15. As shown in FIG. 15, a flow-out nipple part 48 that forms the flow-out opening 47 is formed at the front lid member 4 so that it protrudes towards the front outer side. A first check valve 8 which permits the flow of fluid only to the direction from the outside towards the communicating chamber 43, via the flow-out opening (direction from the left side towards the right side in the drawing), is fit to the flow-out opening 47, in a situation where the interstice is not opened by a later described suction tube 79 or a needle, etc. The first check valve 8 is constituted in the same way as the second check valve 6 shown in FIGS. 9 to 12. In the same way as the second check valve 6, the first check valve 8 is duckbill valve formed in a duckbill-shape by material that has flexibility and elasticity. The tip of the first check valve 8 is fit into the flow-out opening 47, from the outside towards the communicating chamber 43. The first check valve 8 is fixed by the flange part of the first check valve 8 being supported between the flange part of a valve stopper 49 fit to the flow-out nipple part 48, and the tip of the flow-out nipple part 48, in a state where the flange part of the first check valve 8 is locked to the tip of the flow-out nipple part 48.

As shown in FIGS. 4, 5, 13, and 15, at a position in the communicating chamber 43 and facing the flow-out opening 47 (i.e., the tip of the first check valve 8), an absorber 9 that absorbs liquid fuel 99 is placed. The absorber 9 has a flexible spongy structure, and a plurality of minute holes for absorbing the liquid fuel 99 are formed thereto. The absorber is structure so that when pressure is added from the outside in a state where the liquid fuel 99 is included, the liquid fuel 99 absorbed to the inside oozes out to the outside. A sponge, non-woven fabric, or fiber, etc., can be the absorber 9.

At the cylinder vessel 2 structured as above, an interior space if formed by attaching the front lid member 4 and the back lid member 5 to the vessel main body 3. The interior space is separated to the liquid chambers 31, 31, . . . , the pressurized flow passage 32, the pressure adjustment chamber 38, and the communicating chamber 43. The pressure by the flow of the liquid from the flow-in opening 44 to the flow-out opening 47 is transferred in the order from the pressurized flow passage 32, the pressure adjustment chamber 38, the liquid chambers 31, 31, . . . , and to the communicating chamber 43.

At the end of the liquid fuel 99, near the pressure adjustment chamber 38 in each liquid chamber 31, a follower 10 that covers the liquid fuel 99 and follows the end of the liquid fuel 99 is placed. The follower 10 contacts the inner wall surface that forms the liquid chamber 31 (inner wall surface of the bulkhead 33 and the vessel main body 3), and by the follower 10, the liquid chamber 31 is separated into an area at the side of the communicating hole 34 and the opposite area at the side of the pressure adjustment chamber 38. Further, by the followers 10, 10, . . . , the interior space of the cylinder vessel 2 is separated into the area of the side of the flow-out opening 47 and the area of the side of the flow-in opening 44. The follower 10 is a liquid that has a lower affinity towards the liquid fuel 99, such as gel, sol, etc., and it is further preferable that it is a high viscosity fluid that has a higher viscosity than the liquid fuel 99, and is hardly soluble or insoluble towards the liquid fuel 99. Further, it is preferable that the follower 10 has the behavior of a structural viscosity fluid (anomalous viscosity fluid) wherein the appearance stress decreases when the shear stress (shear speed) increases. Concretely, for example, mineral oil such as dimethyl silicone oil, methyl phenyl silicone oil, other silicon oil, and a combination thereof, may be used as the follower 10.

Of the interior space of the cylinder vessel 2, at the region of the side of the flow-out opening 47, separated by the followers 10, 10, . . . , namely at the area near the communicating chamber 43 of the liquid chambers 31, 31, . . . , and the communicating chamber 43, the liquid fuel 99 is filled. The liquid fuel 99 fills out from the flow-out opening 47, and when the volume of the liquid chambers 31, 31, . . . decrease, the back end surface moves from right to left in FIG. 5. The follower 10 that is coherent to the to the back end of the liquid fuel 99 follows the back end surface of the liquid fuel 99, with the back end surface of the liquid fuel 99 moving. Namely, because there is no space in between the follower 10 and the liquid fuel 99, as long as the liquid fuel 99 is filled, in spite of the position of the fuel package 1, the liquid fuel 99 can be supplied to the flow-out opening 47 from the absorber 9 that has the liquid fuel 99 absorbed, because the communicating chamber 43 is filled with the liquid fuel 99.

Next, the communicating interface that freely attaches/detaches the fuel package 1 to/from the power generation module 91, will be described.

Figure 16:
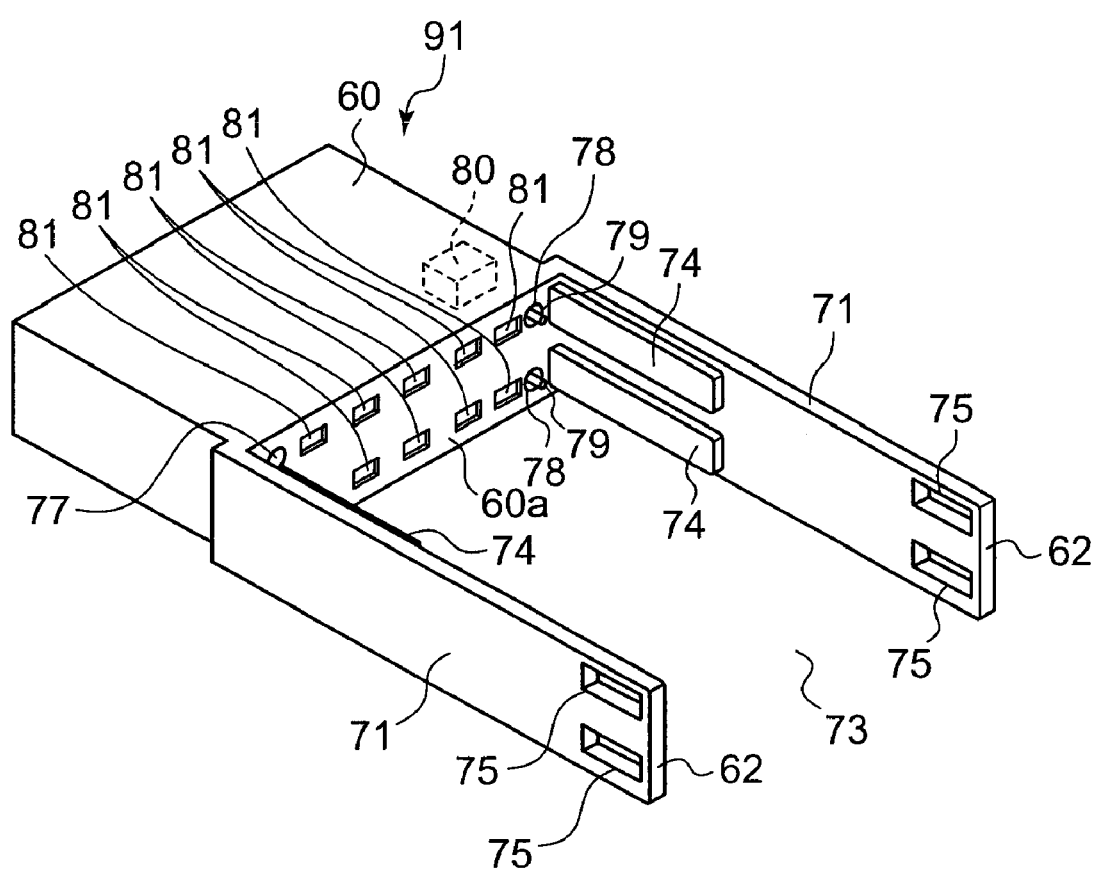
FIG. 16 is a perspective view showing a communicating interface.
Figure 17:
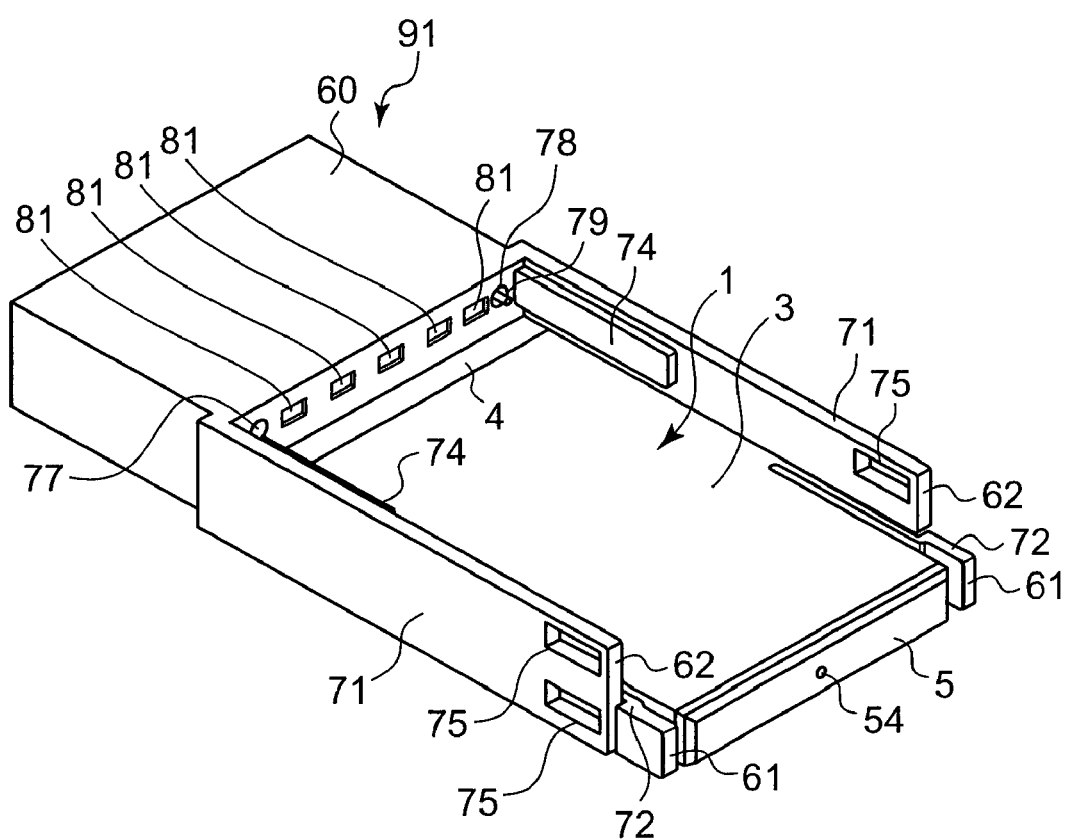
FIG. 17 is a perspective view showing the communicating interface in a state where one fuel package is attached to a power generation module.
Figure 18:
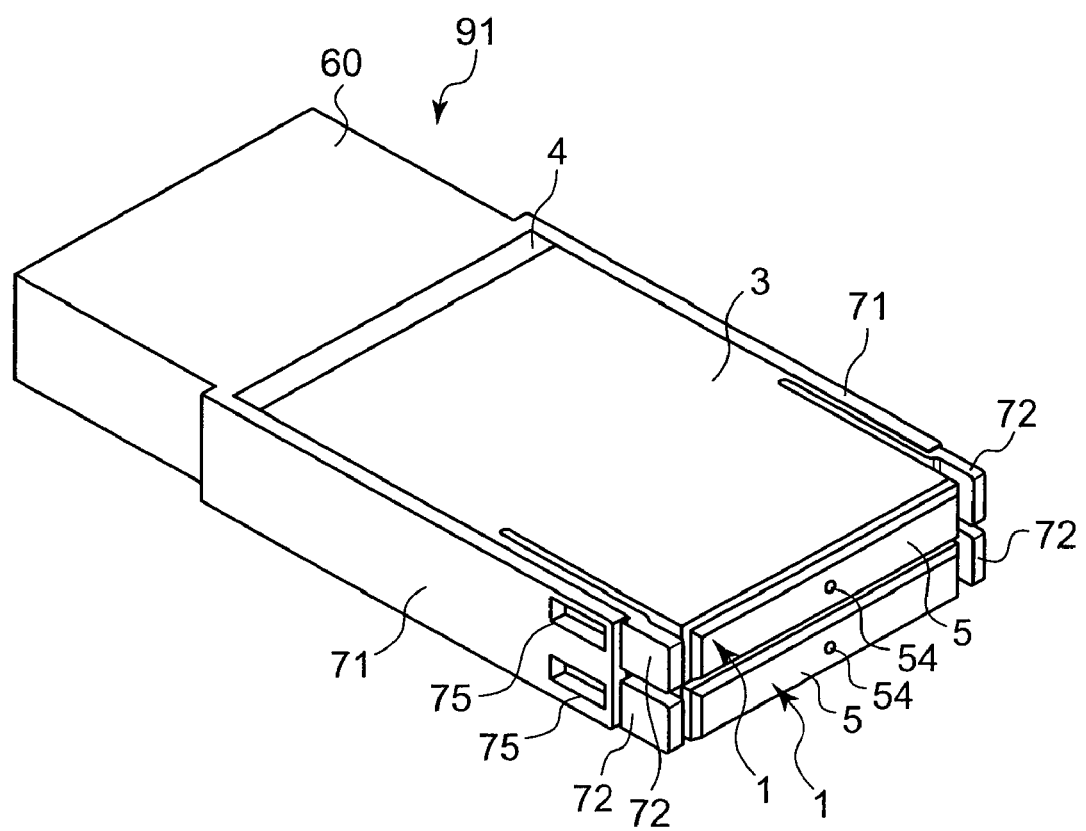
FIG. 18 is a perspective view showing the communicating interface in a state where two fuel packages are attached to the power generation module.

FIGS. 16 to 18 are perspective views showing the communicating interface. FIG. 16 is a diagram showing a situation where the fuel package 1 is detached from a chassis 60 of the power generation module 91. FIG. 17 is a diagram showing a situation where one fuel package 1 is attached to the chassis 60. FIG. 18 is a diagram showing a situation where two fuel packages, 1, 1, are attached to the chassis 60.

Here, in the case of the power generation device shown in FIG. 1, a pump 80, a vaporizer 92, a reformer 93, a carbon monoxide remover 94, and a fuel cell 95 are embedded in the chassis 60, and in the case of the power generation device shown in FIG. 2, a pump 80 and fuel cell 97 is embedded in the chassis 60. In a case where this power generation device is applied to an electronics device such as a portable telephone, a laptop computer, a digital camera, a PDA (Personal Digital Assistance), or an electronic organizer, etc., the chassis 60 of the power generation module 91 may be integrally formed with the chassis of the main body of the electronics device, or the chassis 60 of the power generation module 91 may be freely attachable to/detachable from the chassis of the main body of the electronics device.

As shown in FIG. 3 and FIGS. 16 to 18, the communicating interface that the power generation device includes, comprises a pair of plate-form supporting parts 71, 71 that are formed at the chassis 60, and a pair of elastic engaging section 72, 72 that are formed at the left and right side surface portion of the vessel main body 3. The supporting parts 71, 71 and the elastic engaging section 72, 72 are set so that they engage with each other.

The supporting parts 71, 71 extend backwards from both the left end and the right of a back end surface 60a of the chassis 60. The supporting parts 71, 71 oppose each other left and right, and a storing space 73 is formed in between the supporting parts 71, 71. The storing space 73 formed by the supporting parts 71, 71 is a space for storing the two cylinder vessels 2. In a case where the cylinder vessels 2 are stored in the storing space 73, the front end surface of the cylinder vessels 2 (namely, the front end surface of the front lid member 4) faces the back end surface 60a of the chassis 60. Though the storing space 73 is formed by the supporting parts 71, 71 opposing each other left and right, and the upper part and the lower part of the storing space 73 is open, the storing space 73 may be formed in a hole-shape which opens behind the chassis 60, by covering the upper side and the lower side of the storing space 73. In that case, the back end surface 60a becomes the bottom of the hole-shape storing space 73.

At the surface which is the base end part of the side of the chassis 60 of each supporting part 71, and which is the surface that opposes the supporting part 71, two guide projections 74, 74 that extend long in the longitudinal direction are formed projecting. The guide projections 74, 74 are arranged one above the other.

At the tip side of each of the supporting part 71, two approximately rectangular locking holes 75, 75 that are long in the cross direction are formed so that they penetrate the supporting part 71 at a horizontal direction. The locking holes 75 are arranged one above the other, and at the supporting part 71, are a pair by front and back with the guide projections 74, 74. Though the locking hole 75 penetrates the supporting part 71 in a horizontal direction, it does not have to penetrate the supporting part 71 in a case where the locking holes 75 are formed so that they yield at the respective surfaces that oppose the pair of the supporting parts 71, 71.

On the other hand, at both the left and right side surface of the cylinder 2, guiding target grooves 70, 70 that are long in the cross direction, are formed throughout the front end of the front lid part 4 to the center part of the vessel main body 3. The front end of the guiding target groove 70 is open, and is structured so that the guide projection 74 is inserted in/taken out longitudinally, from the front end side of the guiding target groove 70, and so that the guide projection 74 fits into the guiding target groove 70, being able to slide freely backwards and forwards. Therefore, the backward and forward direction of the power generation device becomes the inserting direction for inserting the cylinder vessel 2 to the storing space 73. Thought the projection 74 is formed at the supporting part 71, and the groove 70 is formed at the cylinder vessel 2, the groove that is long in the cross direction, for guiding, may be formed to the supporting part 71, and the projection that can be fit to the groove and can slide forwards and backwards along the groove may be formed at the cylinder vessel 2.

Further behind the guiding target groove 70, the elastic engaging section 72 is formed at the side surface center portion of the vessel main body 3 so that it is branched, and at the side surface back side of the cylinder vessel 2, the elastic engaging section 72 is separated from the main vessel body 3 and the side surface of the back lid part 5. Including the elastic engaging section 72, the vessel main body 3 is formed by material that has flexibility, such as synthetic resin, etc., (for example, acrylic resin, methacrylic resin, epoxy resin, and poly carbonate, etc.). When the elastic engaging section 72 is pressed to the inward side of the cylinder vessel 2, the elastic engaging section 72 yields to the side of the cylinder vessel 2, the base part being the fixed end, and when the pressing is relieved, the yield of the elastic engaging section 72 is also relieved.

At the outer surface of the elastic engaging section 72, which is the opposite side of the cylinder vessel 2, an engaging projection 76 that can be engaged to the locking hole 75, is formed. The engaging projection 76 protrudes from the elastic engaging section 72 at the cross direction center portion of the elastic engaging section 72. As shown in FIG. 5, the cross-section shape of the engaging projection 76 is triangular. The engaging projection 76 is formed so that the protruding height thereof becomes higher as it goes behind, in order to smoothly attach the fuel package 1 to the chassis 60 of the power generation module 91, by sliding. When the front end surface of the cylinder vessel 2 contacts the back end surface 60a of the chassis 60, in a state where the guide projection 74 of the supporting part 71 is fit to the guiding target groove 70 of the cylinder vessel 2, the engaging projection 76 fits into the engaging hole 75. Further, when the front end surface of the cylinder 2 contacts the back end surface 60a of the chassis 60, in a state where the guide projection 74 of the supporting part 71 is fit to the guiding target groove 70 of the cylinder vessel 2, the back end portion of the elastic engaging section 72 extends further behind the back end portion of the supporting part 71.

As shown in FIGS. 16 and 17, at the position which is the back end surface 60a of the chassis 60 and opposing the flow-in opening 44 of each of the cylinder vessels 2, two exhaust connection (interconnection) openings 77, 77 are formed, and at the position opposing the flow-out opening 47 of each of the cylinder vessels 2, two suction connection (interconnection) openings 78, 78 are formed. In FIGS. 16 and 17, because the exhaust connection opening 77 at the bottom side (left side in the drawing) is hidden by the supporting part 71, the reference number thereof is omitted.

In the suction connection opening 78, a suction tube 79 that is concentric with the suction connection opening 78 is provided. The suction tube 79 protrudes towards the backside from the suction connection opening 78.

In a case where the front end surface of the cylinder 2 contacts the back end surface 60a of the chassis 60, in a state where the guide projection 74 of the supporting part 71 is fit to the guiding target groove 70 of the cylinder vessel 2, the flow-in nipple part 45 is inserted to the exhaust connection opening 77 and the flow-out nipple part 48 is inserted to the suction connection opening 78. When the flow-out nipple part 48 is inserted to the suction connection opening 78, the suction tube 79 as the inserting target material, penetrates through the interior hollow of the first check valve 8 and the interstice, to reach the absorber 9 at the interior of the cylinder vessel 2.

At the interior of the chassis 60, a flow passage that leads from the suction tube 79 to the exhaust connection opening 77, is formed, and the pump is formed therebetween. The liquid fuel 99 in the cylinder vessel 2 is sucked by the pump 80.

Here, in the case of the power generation device shown in FIG. 1, at the middle of the flow passage that leads from the suction tube 79 to the exhaust connection opening 77, the vaporizer 92, the reformer 93, the carbon monoxide remover 94, and fuel cell 95 are arranged in this order, the liquid fuel 99 is supplied to the vaporizer 92 via the suction tube 79, and other than water and carbon dioxide generated by the reformer 93, the carbon monoxide remover 94, and the fuel cell 95, air flows into the interior of the cylinder vessel 2 via the exhaust connection opening 77 and the flow-in opening 44. In this case, it is preferable that the end of the suction tube 70 and the pump 80 are connected, and the flow passage from the suction tube 79 to the exhaust connection opening 77 is a pathway of, suction tube 79 pump 80 vaporizer 92 reformer 93 carbon monoxide remover 94 fuel cell 95 exhaust connection opening 77.

On the other hand, in the case of the power generation device shown in FIG. 2, the pump 80 and the fuel cell 97 are provided in this order in the middle of the flow passage from the suction tube 79 to the exhaust connection opening 77, the liquid fuel 99 is supplied to the pump 80 via the suction tube 79, and other than water and carbon dioxide generated at the fuel cell 97, air flows to the interior of the cylinder vessel 2, via the exhaust connection opening 77 and the flow-in opening 44. The flow passage from the suction tube 79 to the exhaust connection opening 77 may be a pathway of, suction tube 79 pump 80 fuel cell 97 exhaust connection opening 77.

A the position which is the back end surface 60a of the chassis 60, and opposes the liquid chambers 31, 31, . . . , sensors 81, 81, . . . , for detecting the position of each follower, are placed. The sensor 81 comprises a light emitting element that emits light (mainly infrared ray) towards the backside from the outside of the cylinder vessel 2, and a light receiving element (mainly shows the sensitivity towards the infrared ray) that receives light from the back side at the back end surface 60a of the chassis 60 which is in front of the liquid chamber 31. On the other hand, the liquid fuel 99 and the cylinder vessel 2, especially the front lid member 4 and the vessel main body 3 have the behavior of transmitting the light that is generated from the sensor 81, and at the follower 10 in the cylinder vessel 2, a material with a high reflection rate towards the light generated from the sensor 81, (for example, metal grain, etc.) is added. Namely, the optical property (reflection rate, transmission rate, etc.) of the follower 10 differs from the optical property of the liquid fuel 99. Here, in a case where the follower 10 is near the pressure adjustment chamber 38 of the liquid chamber 31, because the distance form the follower 10 to the sensor 81 is long, the light emitted from the light emitting element is attenuated by suction by the liquid fuel 99, etc., upon reaching the follower 10. Even if the light is reflected at the follower 10, because the reflection light is attenuated again by the liquid fuel 99, etc., on its way back, a reflection light with low intensity is received by the light receiving element, and the follower is not detected by the sensor 81. On the other hand, in a case where the follower 10 is near the communicating hole 34 of the liquid chamber 31, because the distance from the follower 10 to the sensor 81 is short, the attenuating amount by the liquid fuel 99, etc., is less, and because the reflection light with a high intensity is received by the light receiving element, when the light generated by the light emitting element is reflected by the follower 10, the sensor 81 can detect the follower 10. Namely, the sensor 81 detects whether the follower 10 is near the communicating hole 34 of the liquid chamber 31, or near the pressure adjustment chamber 38 of the liquid chamber 31, by the received light amount, and detects the displacement of the follower 10 at the longitudinal direction of the liquid chamber 31. Therefore, by detecting the position of the follower 10, the sensor 81 can detect the length of the longitudinal direction of the liquid fuel 99 in the liquid chamber 31, consequently the volume of the liquid fuel 99, namely the remaining amount of liquid fuel 99. The sensor may detect the position of the follower 10 in multi-steps in accordance with the light amount, or may detect by two steps, whether the position of the follower 10 is near the communicating hole 34 of the liquid chamber 31, or not. Though the sensor 81 comprises a light emitting element and a light receiving element, the remaining amount of liquid fuel 99, or the possible operation time by the reaming amount of liquid fuel 99 can be recognized from the screen of an electronics device, by the light receiving element outputting an electric signal (voltage, current) based on the intensity of the irradiated reflection light, the power generation module 91 calculating a remaining amount of fuel, or a possible operation time by the remaining fuel, and the power generation module 91 conveying the information to an electronics device, such as a portable telephone, etc. that is electrically driven.

Next, the way to use the power generation device structured in the above way, and the accompanying operations, will be described.

Even if the liquid fuel 99 is accumulated in the cylinder vessel 2, in a state where the fuel package 1 is not attached to the power generation module 91, the liquid fuel 99 does not leak out from the flow-out opening 47, because the first check valve 8 is closed.

The guide projections 74, 74, are fit into the guiding target grooves 70, 70, the front end surface of the cylinder vessel 2 that has the liquid fuel 99 filled, being towards the back end surface 60a of the chassis 60, the cylinder vessel 2 is pressed towards the chassis 60 at the front side, and the cylinder vessel 2 is moved forward, by the guiding target grooves 70, 70, and the guide projections 74, 74. When the cylinder vessel 2 is moved forward, the elastic engaging sections 72, 72 elastically transform, by the engaging projections 76, 76 contacting the back end of the supporting parts 71, 71, and pushing the engaging projections 76, 76, with the supporting parts 71, 71. Then, engaging projections 76, 76 reach the locking holes 75, 75, to lock the engaging projections 76, 76 to the locking holes 75, 75. Further, in addition with inserting the flow-in nipple unit 45 to the exhaust connection opening 77, the flow-out nipple unit 48 is inserted to the suction connection opening 78, to contact the front end surface of the cylinder vessel 2 to the back end surface 60a of the chassis 60. The guiding target grooves 70, 70 may be provided at the power generation module 91, and the guide projections 74, 74 may be provided at the fuel package 1.

As the above, by just inserting the fuel package 1, by pressing forward towards the power generation module, in a state where the guiding target grooves 70, 70 and the guide projections 74, 74 are fit, the engaging projections 76, 76 can be engaged to the locking holes 75, 75, the flow-in nipple part 45 can be inserted to the exhaust connection opening 77, and the flow-out nipple part 48 can be inserted to the suction connection opening 78. In a state where the power generation module 91 is attached to the fuel package 1, because at the front side of the fuel package 1, the flow-in nipple part 45 is inserted to the exhaust connection opening 77, and the flow-out nipple part 48 is inserted to the suction connection opening 78, and at the back side of the fuel package 1, he engaging projections 76, 76 are engaged with the locking holes 75, 75, the attachment state of the power generation module 91 and the fuel package 1 can be kept firm.

When the flow-out nipple part 48 is inserted to the suction connection opening 78, the suction tube 79 protrudes the interior hollow of the first check valve 8 and the interstice 6e, and reaches the absorber 9. When the absorber 9 is pressed by the suction tube 79, the liquid fuel 99 absorbed by the absorber 9 oozes out from the absorber 9. The fuel 9 that oozed out is supplied to the pump 80 via the suction tube 79. Here, because the fuel that oozes out from the absorber 9 rapidly fills the flow passage from the suction tube 79 to the pump 80, the oozed out fuel functions as pump-priming for lift ranging the level of the pump 80. Further, because the absorber 9 is in a sate in which it is compressed by the suction tube 79, by the negative pressure by the restorative force, the liquid fuel 99 in the cylinder 2 is absorbed by the absorber 9, and the absorbed liquid fuel 99 oozes out to the suction tube 79. Therefore, the fuel can be stably transferred to by the pump 80. Even if bubbles generate in the cylinder vessel 2, because the bubbles are trapped in the absorber 9, the bubbles do not go into the suction tube 79.

In a case where the pump 80 operates in a state where the flow-out opening 47 is connected to the suction connection opening 78, the liquid fuel 99 in the cylinder vessel 2 is absorbed to the pump 80 via the suction tube 79, and the absorbed liquid fuel 99 is exhausted from the pump 80. When the liquid fuel 99 in the cylinder vessel 2 is absorbed, the liquid fuel 99 in the cylinder vessel 2 slowly decreases. However, in accordance with the decrease, shear stress occurs in the follower 10, and the viscosity rate declines, and accompanying the consumption of the liquid fuel 99, the follower 10 follows to the front side of the liquid chamber 31.

By the above operation of the pump 80, the liquid fuel 99 or a fluid in which the liquid fuel 99 is reformed, flows in the order of the vaporizer 92, the reformer 93, the carbon monoxide remover 94, and to the fuel cell 95 (or in the order of the pump 80, to the fuel cell 97), to generate electric energy in the fuel cell 95 or the fuel cell 97. The product generated by the liquid fuel 99 (mainly gas such as carbon dioxide, etc.) is exhausted from the exhaust connection opening 77. By the pressure of the product exhausted from the exhaust connection opening 77, the third check valve 7 opens. By this, the exhausted product is exhausted to the pressurized flow passage 32 and the pressure adjustment chamber 38, the pressure in the pressurized flow passage 32 and the pressure adjustment chamber 38 rises, and by the pressure, the followers 10, 10, . . . , are pushed to the front surface side of the cylinder vessel 2. The pressure that acts to the followers 10, 10, . . . from the side of the pressure adjustment chamber 38, aids the exhaustion of the liquid fuel 99 in the cylinder vessel 2, and lift ranging of the liquid fuel 99 from the interior of the cylinder vessel 2 towards the pump 80 is stably carried out. Therefore, the liquid fuel 99 can be stably transferred, by the pump 80. In a case where the pump 80 is stopped, the transfer of the liquid fuel 99 also stops, and the generation of electric energy in the fuel cell 97 and the generation of the by-product supplied to the pressurized flow passage 32 and the pressure adjustment chamber 38 also stops. In this way, by the pump 80 stopping, the rise of the pressure from the pressure adjustment chamber 38 to the follower 10 is stopped, the position of the liquid fuel 99 and the follower 10 is kept even, and the shape of the follower 10 is retained. Therefore, even if the flow-out nipple part 48 of the fuel package 1 faces any direction, as long as the liquid fuel 99 is left, the liquid fuel 99 is filled in each communicating hole 34 and the communicating chamber 43 of the liquid chambers 31, 31, . . . , therefore, the liquid fuel 99 can be continuously supplied to the pump 80, and because it is structured so that the supply of the bubbles to the pump 80 is reduced as much as possible, the reduction of the supplying ability of the liquid fuel 99 and the power generation rate of the fuel cell 95 can be controlled.

In a case where the pressure in the pressurized flow passage 32 and the pressure adjustment chamber 38 rises, and reaches a predetermined pressure or higher than the predetermined pressure, the check valve 6 opens, and the product in the pressurized flow passage 32 and the pressure adjustment chamber 38 is exhausted from the exhaust opening 54. By this, the pressure in the pressurized flow passage 32 and the pressure adjustment chamber 38 can be maintained at a pressure equal to or higher than a predetermined pressure.

By this, the cylinder vessel 2 breaking, due to the pressure in the pressurized flow passage 32 and the pressure adjustment chamber 38, becoming too high, can be prevented. Further, by the product in the pressure adjustment chamber 38 being exhausted to the outside from the exhaust opening 54, the pressure adjustment chamber 38 can be maintained at an adequate pressure. Further, because the third check valve 7 is provided at the fill-in opening 44, the product exhausted to the pressure adjustment 38 flowing back to the power generation module 91, via the flow-in opening 44 and the exhaust connection opening 77, can be prevented, and the pressure adjustment chamber 38 can be maintained at an adequate pressure. By maintaining the pressure in the pressure adjustment chamber 38 adequate, the liquid fuel 99 can be stably supplied to the power generation module 91 via the suction tube 79.

An operation for measuring the remaining amount of the liquid fuel 99 by the remaining fuel amount measuring device, will be described.

In a case where the liquid fuel 99 is left in the liquid chamber 31, the follower 10 at the liquid chamber 31 is separated from the front side wall surface of the liquid chamber 31, the reflection light amount from the follower 10 is less, and the receiving light amount at the sensor 81 is also less. On the other hand, in a case where remaining amount of the liquid fuel 99 at the liquid chamber 31 is less, the follower 10 at the liquid chamber 31 is near the communicating hole 34 of the front side wall surface of the liquid chamber 31, and the reflection light amount from the follower 10 is more, and the receiving light amount at the sensor 81 is also more. By this, remaining amount information of the liquid fuel 99 can be read by the sensor 81.

Even if the sensors 81, 81, are binary sensors, namely, binary sensors that detect whether the liquid fuel 99 is left in the liquid chamber 31, if it is set so that the time necessary to consume the liquid fuel 99 in the liquid chamber 31 differs according to each liquid chamber 31, it can be measured how much amount of liquid fuel 99 is left in the cylinder vessel 2.

Namely, as the above (A), in a case where the cross-section area of the interior space of the liquid chamber 31 is respectively equal when every liquid chamber 31 is cut perpendicularly in the longitudinal direction, the volume of the liquid fuel 99 in the liquid chamber 31 is the same for each liquid chamber 31, before the consumption of the liquid fuel 99 begins. However, because the opening area of the communicating holes 34 differ according to each liquid chamber 31, the exhausted amount of the liquid fuel 99 that is exhausted from the liquid chamber 31, via the communicating hole 34, differs according to each liquid chamber 31. Therefore, the time necessary to consume the liquid fuel 99 in the liquid chamber 31 (namely, the time necessary for the follower 10 to move from the front end to the back end of the liquid chamber 31), differs according to each liquid chamber 31. Therefore, because the sensors 81, 81, . . . do not detect the follower 10 at the same time, but the sensors 81, 81 detect the follower 10 sequentially, it can be detected how much amount of liquid fuel 99 is left in the cylinder vessel 2. Namely, in a case where every sensor 81, 81, . . . , has not detected the follower 10, it means that the liquid fuel 99 in the cylinder vessel 2 is filled, and as the number of sensors 81 that detect the follower 10 increases, the fuel in the cylinder vessel 2 is decreasing, and in a case where every sensor 81, 81, . . . , detects the follower 10, it means that the liquid fuel 99 in the cylinder vessel 2 is empty.

As the above (B) or (C), in a case where the cross-section area of the interior space of the liquid chamber 31 is respectively different when every liquid chamber 31 is cut perpendicularly in the longitudinal direction, the volume of the liquid fuel 99 in the liquid chamber 31 differs for each liquid chamber 31, before the consumption of liquid fuel 99 begins. However, because the opening area of the communicating holes 34 are the same for every liquid chamber 31, the exhausted amount of the liquid fuel 99 that is exhausted from the liquid chamber 31, via the communicating hole 34, is the same for each liquid chamber 31. Therefore, the time necessary to consume the liquid fuel 99 in the liquid chamber 31 (namely, the lime necessary for the follower 10 to move from the front end to the back end of the liquid chamber 31), differs according to each liquid chamber 31. Therefore, because the sensors 81, 81, . . . do not detect the follower 10 at the same time, but the sensors 81, 81 detect the follower 10 sequentially, it can be detected how much amount of liquid fuel 99 is left in the cylinder vessel 2.

Figure 19:
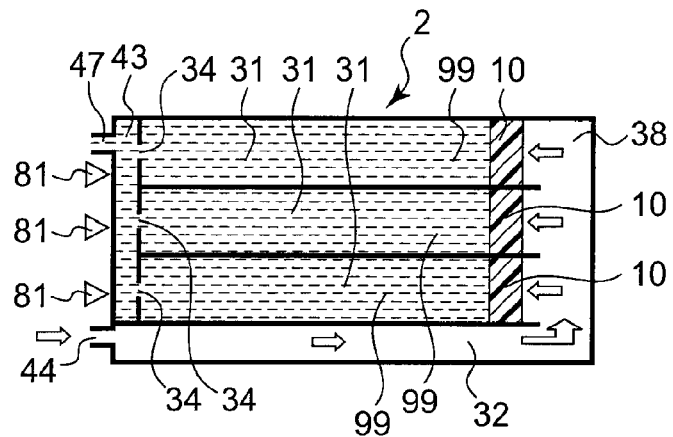
FIG. 19 is a transverse sectional view for describing operation of a remaining fuel amount measuring device according to the fuel that flows out.
Figure 20:
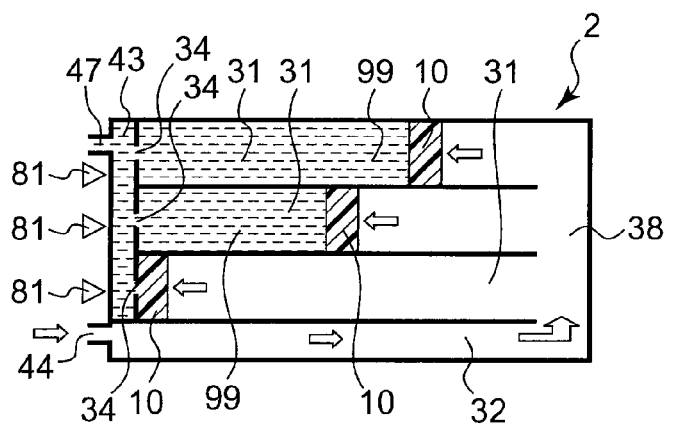
FIG. 20 is a transverse sectional view for describing operation of the remaining fuel amount measuring device according to the fuel that flows out.
Figure 21:
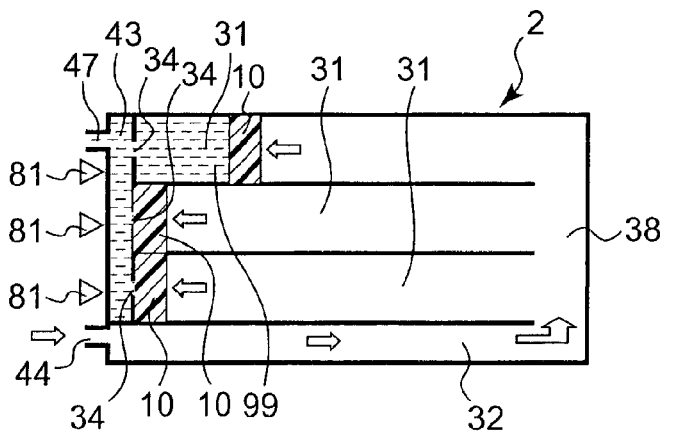
FIG. 21 is a transverse sectional view for describing operation of the remaining fuel amount measuring device according to the fuel that flows out.

Concrete descriptions will be made with reference to FIGS. 19 to 21, and FIGS. 22 to 24. FIGS. 19 to 21 are drawings for describing the operation concerning a case where the cross-section area of the interior space of the liquid chamber 31 is respectively equal when every liquid chamber 31 is cut perpendicularly in the longitudinal direction, the opening area of the communicating hole 34, 34 becoming larger moving towards the left side (lower side in the drawings). FIGS. 22 to 24 are drawings for describing the operation concerning a case where the opening area of every communicating hole 34 is equal, and the cross-section area of the interior space of the liquid chamber 31 becomes larger moving to the right side (the upper side in the drawings) when the liquid chambers 31, 31, . . . are cut perpendicularly to the longitudinal direction. To simply the description, the number of the communicating holes 34 in FIGS. 19 to 21, and FIGS. 22 to 24 are three. However, the number of communicating holes 34 is not limited to three, and the same effect can be obtained as long as the number of communicating holes 34 is plural.

As shown in FIG. 19, because in the initial state, the liquid fuel 99 is filled approximately the same amount for each liquid chamber 31, 31, . . . , the position of each of the followers 10, 10, . . . , is separated from the front end of the liquid chamber 31. However, as shown in FIG. 20, because as the liquid fuel 99 is consumed, the liquid chamber 31 with the communicating hole 34 that has a large opening area consumes more fuel in the interior than the communicating holes 34 that have a small opening area, a difference in position of the follower 10 from the sensor 81 generates, between the liquid chamber 31 that has a larger opening area and a liquid chamber 31 that has a small opening area. Then, the follower 10 at the most left liquid chamber 31 in the beginning (down side in the drawing), is placed at the front end of the liquid chamber 31, for the sensor 81 to detect the reflection light from the follower 10. At the power generation module 91, when a detection signal is transmitted to a control circuit in the power generation module 91, the remaining amount in the fuel package 1 is specified by the signal, and a remaining amount signal is output to an electronics device that is driven by the electric energy output from the power generation module 91. In the state such as shown in FIG. 20, the remaining amount of liquid fuel 99 is approximately middle the remaining amount at the initial state and when the liquid fuel 99 is empty. Further, as the liquid fuel 99 is consumed, as shown in FIG. 21, the follower 10, which is placed at the center (middle level in the drawing), that has the opening area of the communicating 34, at the middle liquid chamber 31, moves to the front end of the liquid chamber 31, and the sensor 81 detects the middle follower 10 and outputs a remaining amount signal to the electronics device. The reaming amount of liquid fuel 99 at this time is less than the time shown in FIG. 20. Then, the follower 10, which is placed at the most right (upper side in the drawing), in the liquid chamber 31 with the smallest opening area, moves to the front end of the liquid chamber 31, and the sensor 81 detects the middle follower 10 and outputs an information signal indicating information that the reaming amount is scarce, to the electronics device.

As shown in FIG. 22, because in the initial state, the liquid fuel 99 is filled approximately the same amount for each liquid chamber 31, 31, . . . , the position of each of the followers 10, 10, . . . , is separated from the front end of the liquid chamber 31. However, as shown in FIG. 23, because as the liquid fuel 99 is consumed, the liquid chamber with the communicating hole 34 that has a large opening area consumes more fuel in the interior than the communicating holes 34 that have a small opening area, a difference in position of the follower 10 from the sensor 81 generates, between the liquid chamber 31 that has a larger opening and a liquid chamber 31 that has a small opening area, and the follower 10 at the most left liquid chamber 31 (lower side in the drawing) in the beginning, is positioned at the front end of the liquid chamber 31, for the sensor 81 to detect the reflection light from the follower 10. At the power generation module 91, when a detection signal is transmitted to a control circuit in the power generation module 91, the remaining amount in the fuel package 1 is specified by the signal, and a remaining amount signal is output to an electronics device that is driven by the electric energy output from the power generation module 91. In the state such as shown in FIG. 23, the remaining amount of liquid fuel 99 is approximately middle the remaining amount at the initial state and when the liquid fuel 99 is empty. Further, as the liquid fuel 99 is consumed, as shown in FIG. 24, the follower 10, which is placed at the center (middle level in the drawing), that has the opening area of the communicating 34, at the middle liquid chamber 31, moves to the front end of the liquid chamber 31, and the sensor 81 detects the middle follower 10 and outputs a remaining amount signal to the electronics device. The reaming amount of liquid fuel 99 at this time is less than the time shown in FIG. 23. Then, the follower 10, which is placed at the most right (upper side in the drawing), in the liquid chamber 31 with the interior space that has the largest cross-section area, moves to the front end of the liquid chamber 31, and the sensor 81 detects the middle follower 10 and outputs an information signal indicating information that the reaming amount is scarce, to the electronics device.

As the above, accompanying the consumption of fuel in the liquid chambers 31, 31, . . . , as the material of liquid fuel 99 in each chamber 31 sequentially becomes empty, or becomes close to empty, the sensors 81, 81, that correspond to each liquid chamber 31 sequentially detects the reflection light from the follower 10, to detect in multi-steps, how much amount of liquid fuel 99 is left in the cylinder vessel 2. The area of the communicating holes 34, 34, and the cross-section area of the interior space of the liquid chambers 31, 31, . . . , may be set so that, for example, the total amount of liquid fuel 99 in the fuel package 1, is 50% in a case where the sensor 81 in the first liquid chamber 31 detects enough light, and the total amount of liquid fuel 99 in the fuel package 1, is 25%, in a case where the sensor 81 in the second liquid chamber 31 detects enough light.

In the above fuel package 1, the length of the liquid chambers 31, 31, . . . , in the longitudinal direction are all equal, and the cross-section area of the interior space, when each liquid chamber 31 is cut perpendicularly in the longitudinal direction, is constant from the front end side to the back end side. However, it is not limited to this, and by differing the antero-posterior length of the of the liquid chambers 31, 31, . . . , the volume in which the liquid fuel 99 in the liquid chambers 31, 31, . . . , is filled, may be respectively differed. In this case, the cross-section area of the interior space when the liquid chambers 31, 31, . . . , are cut perpendicularly in the longitudinal direction, may be respective the same or different, and the opening area of the communicating holes 34, 34, . . . , may be respectively the same or different.

The detachment of the fuel package 1 will be described.

In a case where the liquid fuel 99 in the cylinder vessel 2 becomes empty or becomes close to empty, the fuel package is changed to a new fuel package 1. At the time of exchange, the fuel package 1 that is already attached is detached. Here, in a case where fuel package 1 is attached to the power generation module 91, because the back ends 61, 61, of the elastic engaging sections 72, 72, extend backwards than the back ends 62, 62, of the supporting parts 71, 71, the back ends of the elastic engaging sections 72, 72, can be brought close together so as to sandwich the back ends, without receiving interference from the supporting parts 71, 71. In a case where the back ends of the elastic engaging sections 72, 72 area brought close together and sandwiched, the elastic engaging sections 72, 72, elastically transform, and the engaging projections 76, 76 are detached from the locking holes 75. In that state, in a case where the fuel package 1 is pulled out backwards from the power generation module 91, the fuel package 1 can be detached from the power generation module 91.

As the above, because it is structured so that a communicating hole 35 is provided, and gas such as carbon dioxide, etc., as the by-product, flows into the liquid chamber 31 from the communicating hole 35, so as to prevent the pressure in the liquid chamber 31 from decreasing, accompanying the amount of liquid fuel 99 that decreases when the liquid fuel 99 accumulated in the cylinder vessel 2 of the fuel package 1 flows out from the communicating hole 34, the pressure in the liquid chamber 31 can be maintained equal to or higher than a predetermined pressure, in spite of the liquid fuel 99 flowing out. Therefore, it becomes easier for the follower 10 to follow to the back end surface of the liquid fuel, and an air gap is unlikely to generate in the interior space between the follower 10 and the communicating chamber 43, especially in between the follower 10 and the liquid fuel 99, and the interior of the communicating chamber 43. Therefore, even if the position of the fuel package 1 is changed, because the communicating chamber 43 of the fuel package 1 is always filled with the liquid fuel 99, the liquid fuel 99 can be stably supplied.

In a case where electric energy by the power generation device of the present invention provided at the interior of the electronics device is necessary, or in a case where the charging amount of the charging unit of the power generation module 91 is not enough, the liquid fuel 99 is supplied to the power generation module 91 from the fuel package 1, if the pump 80 is operated. In a case where electric energy by the power generation device of the present invention provided at the interior of the electronics device is not necessary, or in a case where the charging amount of the charging unit of the power generation module 91 is enough, if the control circuit stops the operation of the pump 80, and heating to the vaporizer 92, the reformer 93, and the carbon monoxide remover 94, electric energy is not generated, because supply of the liquid fuel 99 and chemical reaction stop.

Because the liquid fuel 99 is supplied by the pump 80, the time that it takes for the liquid fuel 99 to reach the fuel cell 95 or the fuel cell 97 of the power generation module 91, after attaching the fuel package 1 to the power generation module 91, is shorter compared to a case where the liquid fuel 99 is supplied by capillary force.

Also, because the liquid fuel 99 is supplied to the power generation module 91 from the fuel package 1, by the suction force of the pressure adjustment chamber 38 and the pump 80, in a situation where the liquid fuel 99 is filled to the liquid chambers 31, 31, . . . separated by the followers 10, 10, . . . , and the communicating chamber 43, the liquid fuel 99 can be stably supplied.

By providing the communicating chamber 43, the fuel 99 flows out from each liquid chamber 31, using a single flow-out nipple part 48, a single first check valve 8, and a single absorber 9. However, it is not limited to this, and can be structured so that the fuel 99 flows out independently, by providing a flow-out nipple part 48, a single first check valve 8, and a single absorber 9, to each of the liquid chambers 31. Accompanying this, the power generation module 91 may match the number and position of the suction connection opening 78 and the suction tube 79 with the number of the liquid chambers 31, 31, . . . , and the position of the flow-out nipple part 48. At this time, there may be or may not be a communicating chamber 43.

Because a pump 80 is provided at the power generation module 91, it is not necessary to provide a pump at the fuel package 1, therefore, the manufacturing cost of the fuel package 1 can be reduced. Further, even in the case where the fuel package 1 becomes empty, and a new fuel package 1 is attached to the power generation module 91, the pump provided at the power generation module 91 can be used for supplying the fuel 99 of the new fuel package 1.

Also, of the two regions of the liquid chamber 31 separated by the follower 10, because the liquid fuel 99 is filled to the region at the side of the communicating hole 34, the follower 10 is detected by the sensor 81 only when the liquid fuel 99 is consumed from the liquid chamber 31. Namely, as long as the liquid fuel 99 is filled to the region of the side of the communicating hole 34 of the liquid chamber 31, the follower 10 is not detected by the sensor 81, no matter what position the cylinder vessel 2 is in. On the contrary, when the liquid fuel 99 is consumed from the region of the side of the communicating hole 34 of the liquid chamber 31, the follower 10 is placed near the communicating hole 34, and the follower 10 is detected by the sensor 81. Therefore, the remaining amount of the liquid fuel 99 in the cylinder vessel 2 can be measured, despite the position of the cylinder vessel 2.

Because the sensors 81, 81, . . . , are provided at the power generation module 91, and not at the cylinder vessel 2, the manufacturing cost of the fuel package 1 can be reduced. Further, even in a case where the disposable cylinder vessel 2 becomes empty, and a new fuel package is attached to the power generation module 91, the same sensors 81, 81, . . . , provided at the power generation module 91 can be used for detecting the followers 10, 10, . . . at the new fuel package 1. Also, because material of a high reflection rate towards the light emitted from the light emitting element of the sensor 81 is added to the follower 10, the follower 10 can be detected more easily by the receiving light element of the sensor 81.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A remaining fuel amount measuring device which measures a remaining amount of a liquid fuel, the device comprising:

a sensor which detects displacement of a follower that separates an end of the liquid fuel, in a liquid chamber that contains the liquid fuel, so that the end of the liquid fuel is covered, and follows the end of the liquid fuel;

wherein the follower is a high viscosity fluid that has a higher viscosity than the liquid fuel.

2. The remaining fuel amount measuring device according to claim 1, wherein the device comprises a plurality of the sensors which respectively detect displacements of a plurality of the followers in a plurality of the liquid chambers, which are provided in a vessel.

3. The remaining fuel amount measuring device according to claim 1, wherein the follower is displaced in accordance with flowing out of the liquid fuel from a communicating hole provided at the liquid chamber.

4. The remaining fuel amount measuring device according to claim 1, wherein:

the device comprises a plurality of the sensors which respectively detect displacements of a plurality of the followers in a plurality of the liquid chambers, which are provided in a vessel;

a plurality of communicating holes are provided at the plurality of liquid chambers, respectively;

the follower in each liquid chamber of the vessel is displaced in accordance with flowing out of the liquid fuel from the communicating hole provided at the liquid chamber;

respective opening areas of the plurality of communicating holes are equal; and respective liquid-storinq volumes of the plurality of liquid chambers are different.

5. The remaining fuel amount measuring device according to claim 1, wherein:

the device comprises a plurality of the sensors which respectively detect displacements of a plurality of the followers in a plurality of the liquid chambers, which are provided in a vessel;

a plurality of communicating holes are provided at the plurality of liquid chambers, respectively;

the follower in each liquid chamber of the vessel is displaced in accordance with flowing out of the liquid fuel from the communicating hole provided at the liquid chamber;

respective opening areas of the plurality of communicating holes are different; and respective liquid-storinq volumes of the plurality of liquid chambers are equal.

6. The remaining fuel amount measuring device according to claim 1, wherein the sensor comprises a light emitting element that emits light from outside of the liquid chamber towards the follower via the liquid fuel, and a light receiving element that receives light from the light emitting element from inside of the liquid chamber.

7. The remaining fuel amount measuring device according to claim 6, wherein the light emitting element emits light having a wavelength region indicating reflexivity towards the follower.

8. The remaining fuel amount measuring device according to claim 6, wherein the light emitting element emits light having a wavelength region indicating perviousness towards a vessel in which the liquid chamber is provided.

9. The remaining fuel amount measuring device according to claim 1, wherein the remaining fuel amount measuring device is provided at an interior of a power generation module which can be freely attached to and detached from a fuel package that has the liquid fuel filled therein, and which generates electric energy based on the liquid fuel.

* * * * *